United States Patent
Kuen et al.

(10) Patent No.: US 12,272,127 B2
(45) Date of Patent: Apr. 8, 2025

(54) DETECTING DIGITAL OBJECTS AND GENERATING OBJECT MASKS ON DEVICE

(71) Applicant: Adobe Inc., San Jose, CA (US)

(72) Inventors: Jason Wen Yong Kuen, Santa Clara, CA (US); Su Chen, San Jose, CA (US); Scott Cohen, Sunnyvale, CA (US); Zhe Lin, Fremont, CA (US); Zijun Wei, San Jose, CA (US); Jianming Zhang, Campbell, CA (US)

(73) Assignee: Adobe Inc., San Jose, CA (US)

( * ) Notice: Subject to any disclaimer, the term of this patent is extended or adjusted under 35 U.S.C. 154(b) by 404 days.

(21) Appl. No.: 17/589,114

(22) Filed: Jan. 31, 2022

(65) Prior Publication Data
US 2023/0128792 A1 Apr. 27, 2023

Related U.S. Application Data

(60) Provisional application No. 63/271,150, filed on Oct. 23, 2021.

(51) Int. Cl.
*G06V 10/82* (2022.01)
*G06N 3/08* (2023.01)
*G06T 7/00* (2017.01)

(52) U.S. Cl.
CPC ............... *G06V 10/82* (2022.01); *G06N 3/08* (2013.01); *G06T 7/97* (2017.01); *G06T 2207/20081* (2013.01)

(58) Field of Classification Search
None
See application file for complete search history.

(56) References Cited

U.S. PATENT DOCUMENTS

| | | | |
|---|---|---|---|
| 11,176,384 B1* | 11/2021 | Yang | H04N 23/54 |
| 11,328,392 B2* | 5/2022 | Bai | G06T 5/60 |
| 2013/0136338 A1* | 5/2013 | Asente | G06T 7/174 |
| | | | 382/154 |

(Continued)

OTHER PUBLICATIONS

Martinez et al., "Real-Time Instance Segmentation of Traffic Videos for Embedded Devices," Sensors 2021, 21, 275. https://doi.org/10.3390/s21010275 (Year: 2021).*

(Continued)

*Primary Examiner* — Soo Shin
(74) *Attorney, Agent, or Firm* — Keller Preece PLLC

(57) ABSTRACT

The present disclosure relates to systems, methods, and non-transitory computer-readable media that generates object masks for digital objects portrayed in digital images utilizing a detection-masking neural network pipeline. In particular, in one or more embodiments, the disclosed systems utilize detection heads of a neural network to detect digital objects portrayed within a digital image. In some cases, each detection head is associated with one or more digital object classes that are not associated with the other detection heads. Further, in some cases, the detection heads implement multi-scale synchronized batch normalization to normalize feature maps across various feature levels. The disclosed systems further utilize a masking head of the neural network to generate one or more object masks for the detected digital objects. In some cases, the disclosed systems utilize post-processing techniques to filter out low-quality masks.

20 Claims, 18 Drawing Sheets

(56) References Cited

U.S. PATENT DOCUMENTS

| | | | |
|---|---|---|---|
| 2017/0039723 A1* | 2/2017 | Price | G06T 7/174 |
| 2021/0064001 A1* | 3/2021 | de Beus | G06N 20/10 |
| 2021/0264589 A1 | 8/2021 | Jacob et al. | |
| 2021/0370993 A1* | 12/2021 | Qian | G06T 7/75 |
| 2022/0036109 A1* | 2/2022 | Singh | G06F 18/285 |
| 2022/0058429 A1* | 2/2022 | Zou | G06V 10/761 |
| 2022/0198209 A1* | 6/2022 | Spears | G06V 10/454 |
| 2022/0230321 A1 | 7/2022 | Zhao et al. | |
| 2022/0391621 A1* | 12/2022 | Chen | G06V 20/52 |
| 2023/0104262 A1* | 4/2023 | Lin | G06V 10/25 |
| | | | 382/173 |
| 2024/0055101 A1* | 2/2024 | Panetta | G06Q 10/06 |

OTHER PUBLICATIONS

Liu et al., "Path Aggregation Network for Instance Segmentation," 2018 IEEE/CVF Conference on Computer Vision and Pattern Recognition, Jun. 18-23, 2018, DOI: 10.1109/CVPR.2018.00913 (Year: 2018).*

Kaiming He, Georgia Gkioxari, Piotr Dollar, and Ross Girshick. Mask r-cnn. In Proceedings of the IEEE international conference on computer vision, pp. 2961-2969, 2017.

Sergey Ioffe and Christian Szegedy. Batch normalization: Accelerating deep network training by reducing internal covariate shift. In International conference on machine learning, pp. 448-456. PMLR, 2015.

Youngwan Lee and Jongyoul Park. Centermask: Real-time anchor-free instance segmentation. In Proceedings of the IEEE/CVF conference on computer vision and pattern recognition, pp. 13906-13915, 2020.

Tsung-Yi Lin, Piotr Dollar, Ross Girshick, Kaiming He, Bharath Hariharan, and Serge Belongie. Feature pyramid networks for object detection. In Proceedings of the IEEE conference on computer vision and pattern recognition, pp. 2117-2125, 2017.

Paulius Micikevicius, Sharan Narang, Jonah Alben, Gregory Diamos, Erich Elsen, David Garcia, Boris Ginsburg, Michael Houston, Oleksii Kuchaiev, Ganesh Venkatesh, et al. Mixed precision training. arXiv preprint arXiv:1710.03740, 2017.

Pramod Kaushik Mudrakarta, Mark Sandler, Andrey Zhmoginov, and Andrew Howard. K for the price of 1: Parameter-efficient multi-task and transfer learning. In ICLR, 2019. Pramod Kaushik Mudrakarta, Mark Sandler, Andrey Zhmoginov, and Andrew Howard. K for the price of 1: Parameter-efficient multi-task and transfer learning. In ICLR, 2019.

Chao Peng, Tete Xiao, Zeming Li, Yuning Jiang, Xiangyu Zhang, Kai Jia, Gang Yu, and Jian Sun. Megdet: A large mini-batch object detector. In Proceedings of the IEEE Conference on Computer Vision and Pattern Recognition, pp. 6181-6189, 2018.

Shaoqing Ren, Kaiming He, Ross Girshick, and Jian Sun. Faster r-cnn: Towards real-time object detection with region proposal networks. Advances in neural information processing systems, 28: 91-99, 2015.

Tim Salimans and Durk P Kingma. Weight normalization: A simple reparameterization to accelerate training of deep neural networks. Advances in neural information processing systems, 29:901-909, 2016.

Mingxing Tan and Quoc Le. Efficientnet: Rethinking model scaling for convolutional neural networks. In International Conference on Machine Learning, pp. 6105-6114. PMLR, 2019.

Zhi Tian, Chunhua Shen, Hao Chen, and Tong He. Fcos: Fully convolutional one-stage object detection. In Proceedings of the IEEE/CVF international conference on computer vision, pp. 9627-9636, 2019.

Yuxin Wu and Kaiming He. Group normalization. In Proceedings of the European conference on computer vision (ECCV), pp. 3-19, 2018.

Lu Yang, Qing Song, Zhihui Wang, Zhiwei Liu, Songcen Xu, and Zhihao Li. Quality-aware network for human parsing. arXiv preprint arXiv:2103.05997, 2021.

Fisher Yu and Vladlen Koltun. Multi-scale context aggregation by dilated convolutions. In ICLR, 2016.

Shifeng Zhang, Cheng Chi, Yongqiang Yao, Zhen Lei, and Stan Z Li. Bridging the gap between anchor-based and anchor-free detection via adaptive training sample selection. In Proceedings of the IEEE/CVF conference on computer vision and pattern recognition, pp. 9759-9768, 2020.

Xiangyun Zhao, Samuel Schulter, Gaurav Sharma, Yi-Hsuan Tsai, Manmohan Chandraker, and Ying Wu. Object detection with a unified label space from multiple datasets. In European Conference on Computer Vision, pp. 178-193. Springer, 2020.

Xingyi Zhou, Vladlen Koltun, and Philipp Krahenbuhl. Simple multi-dataset detection. arXiv preprint arXiv:2102.13086, 2021.

Combined Search and Examination Report received in application No. GB 2212267.5 dated Feb. 20, 2023.

Notification of Grant in application GB application No. GB 2212267.5 dated Oct. 17, 2023.

* cited by examiner

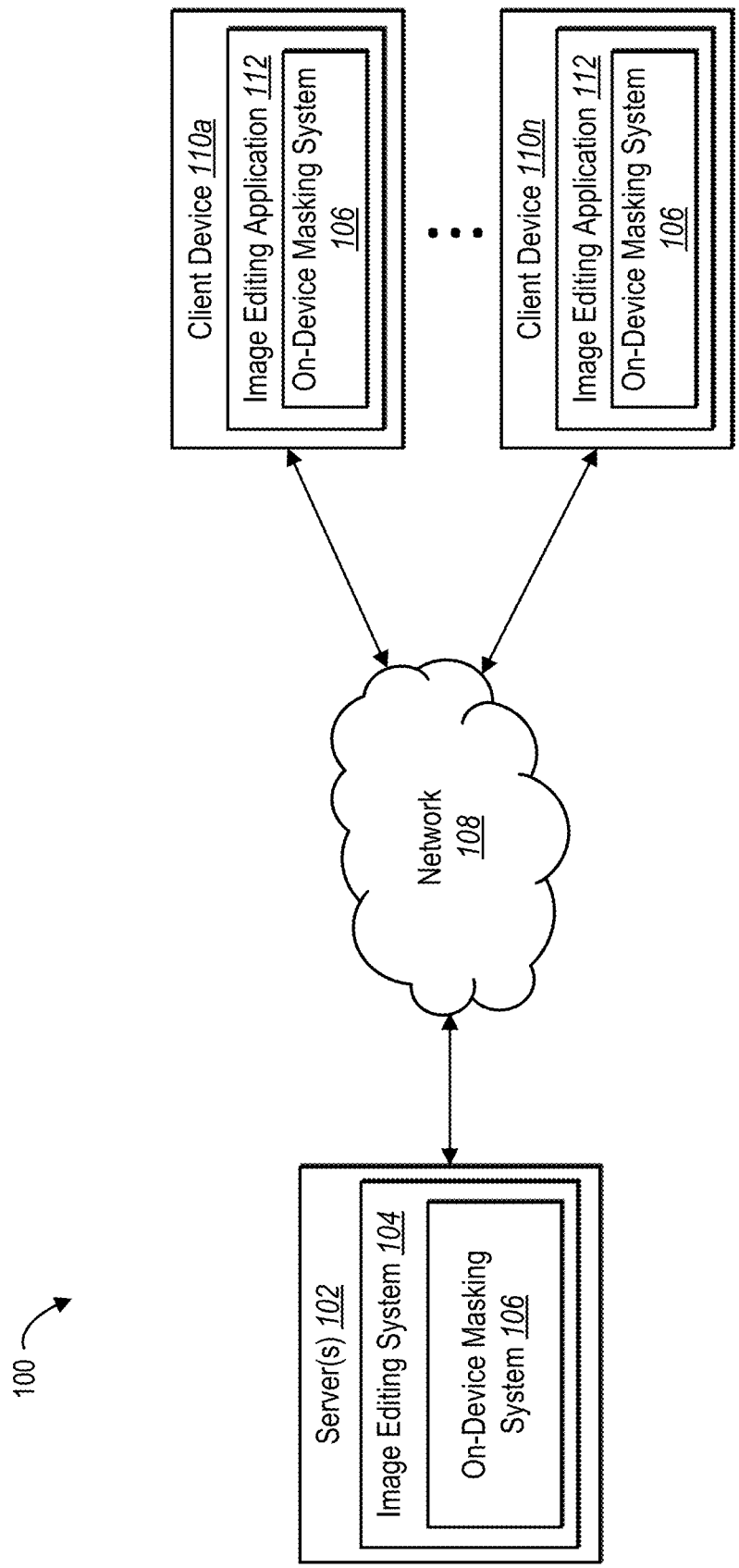

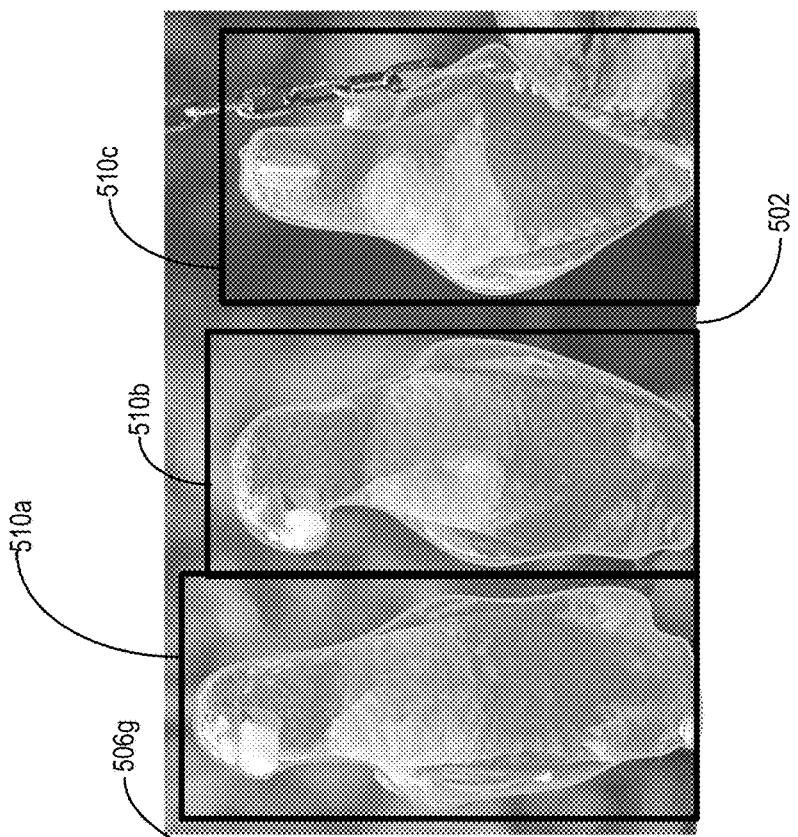
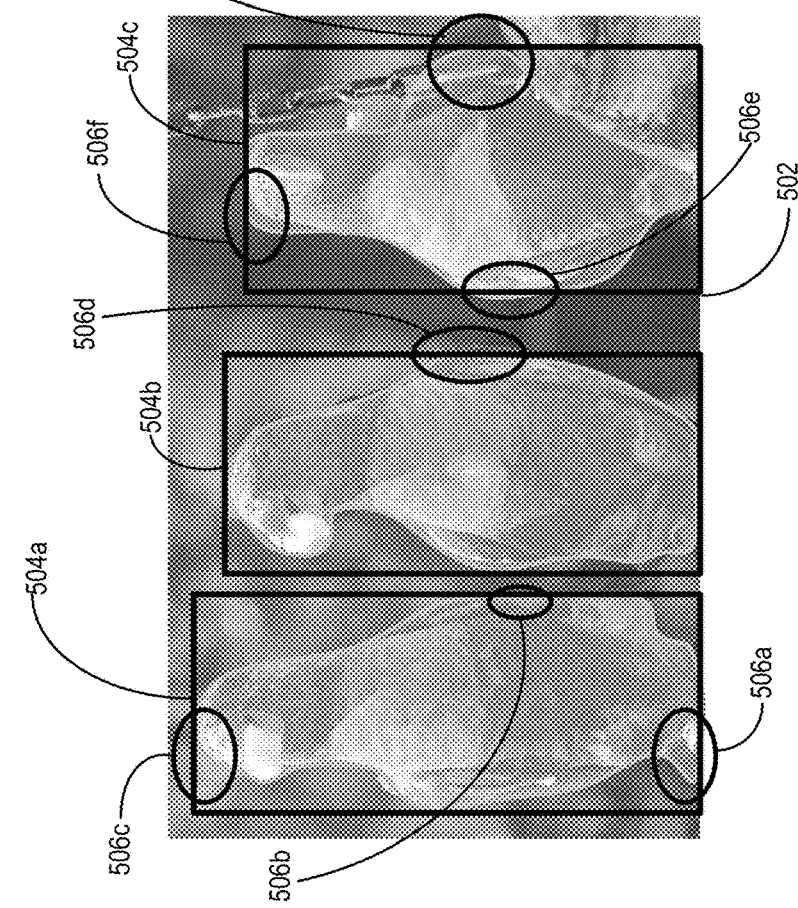
Fig. 5A
Fig. 5B

Fig. 7A  object in RGB
Fig. 7B  28x28 training label
Fig. 7C  56x56 training label

DETECTING DIGITAL OBJECTS AND GENERATING OBJECT MASKS ON DEVICE

CROSS-REFERENCE TO RELATED APPLICATIONS

This application claims priority to and the benefit of U.S. Provisional Patent Application No. 63/271,150, filed Oct. 23, 2021, which is incorporated herein by reference in its entirety.

BACKGROUND

Recent years have seen significant advancement in hardware and software platforms for image editing. For example, many systems exist which detect digital objects portrayed in a digital image. Further, some conventional systems generate object masks for the digital objects that has been detected within the digital image. Using the generated object mask, the conventional systems are able to perform various modifications to the digital image (e.g., by removing or editing the digital object or applying a filter to the background of the digital image).

Despite these advances, however, conventional image editing systems suffer from several technological shortcomings that result in inefficient, inflexible, and inaccurate operation. For instance, many conventional systems utilize model components that require excessive computing resources, such as memory and processing power. As an example, some conventional systems perform object detection utilizing group normalization neural network layers or large backbone networks, which are computationally expensive at inference time.

In addition to the efficiency problems described above, conventional image editing systems often fail to operate flexibly. For example, due to the significant consumption of computing resources, many conventional systems are rigidly limited to relying on resource-rich devices to perform object detection and/or segmentation. To illustrate, many conventional systems require a client device displaying a digital image to offload object detection and segmentation operations to another device (e.g., a server), as the client device lacks the resources necessary to implement the computationally expensive models used for such operations. In addition, some conventional systems are rigidly limited to closed-set training examples having a predefined set of category labels when learning to identify and segment objects. As a result, many conventional systems are prevented from detecting/classifying and then segmenting a wide range of object instances within digital images not included in the training examples.

Further conventional image editing systems often operate inaccurately. For example, by limiting training to closed-set examples, conventional systems typically only learn class-specific features associated with the closed set and fail to generalize to objects of unseen classes. Accordingly, conventional systems fail to accurately detect digital objects that have not been seen. Additionally, conventional systems may utilize tight bounding boxes for detected objects; however, such bounding boxes might be unfavorable for segmentation, often resulting in artifacts where the object pixels stick to the box border in an unnatural manner.

These, along with additional problems and issues, exist with regard to conventional image editing systems.

SUMMARY

One or more embodiments described herein provide benefits and/or solve one or more of the foregoing problems in the art with systems, methods, and non-transitory computer-readable media that implement a flexible, on-device pipeline for object detection and segmentation using an efficient neural network model. In particular, in one or more embodiments, a system employs a neural network model having a detection head for identifying objects within a digital image and a masking head for generating object masks for the identified objects. In some cases, the neural network model includes a plurality of detection heads that collectively perform class-agnostic object detection. In some instances, the detection head(s) utilizes multi-scale synchronized batch normalization to perform the object detection. In some implementations, the system further utilizes post-processing techniques to filter out poor-quality object masks. In this manner, the system implements an efficient, light-weight model that is able to perform object detection and segmentation on device while ensuring mask quality.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which:

FIG. 1 illustrates an example environment in which an on-device masking system operates in accordance with one or more embodiments;

FIGS. 5A-5B illustrate a visual comparison of approximate boundaries and expanded approximate boundaries generated for digital objects in accordance with one or more embodiments;

DETAILED DESCRIPTION

Figure 2A:
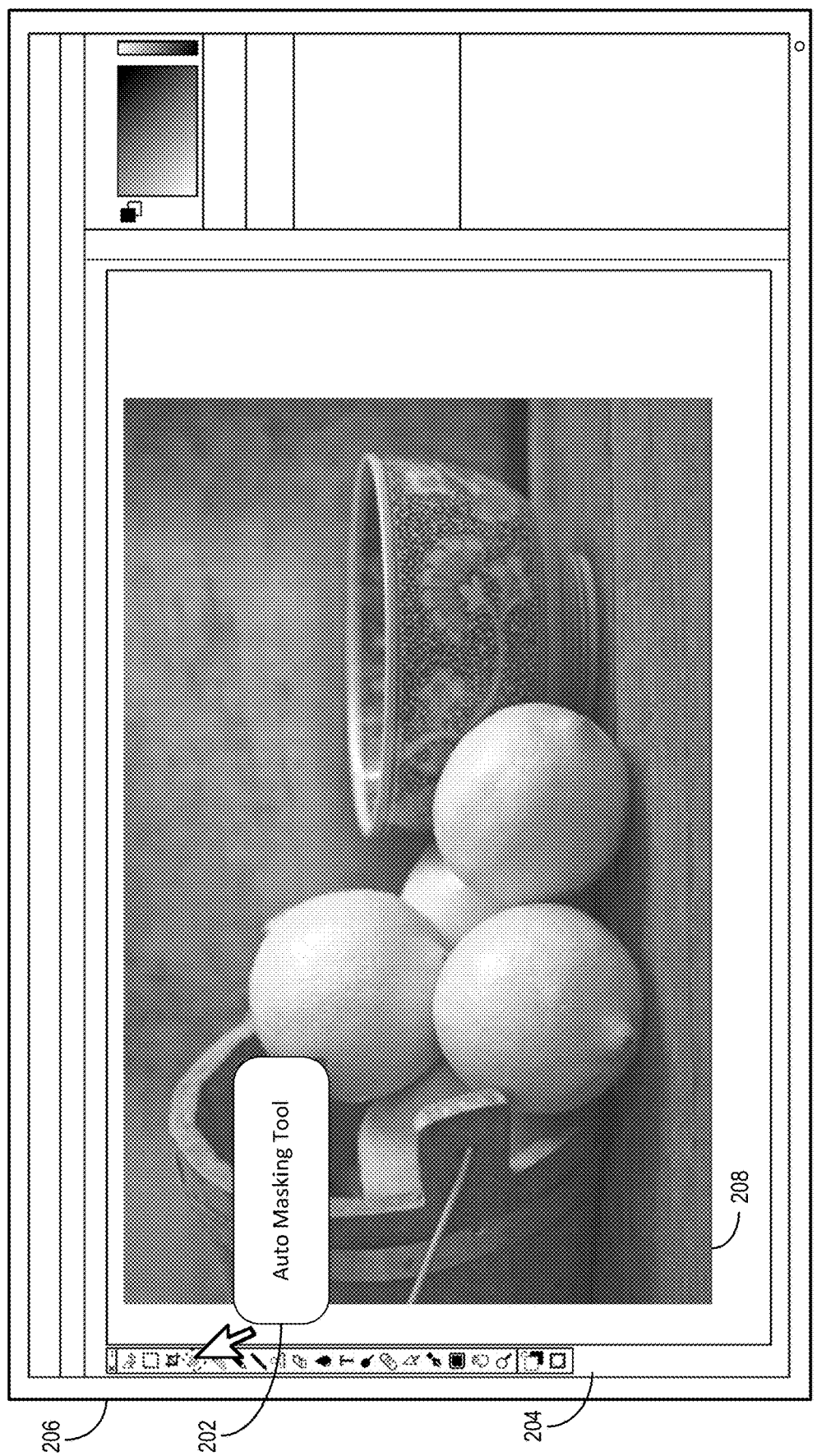
FIGS. 2A-2E illustrates an overview diagram of the on-device masking system facilitating the provision of object masks corresponding to selected digital objects in accordance with one or more embodiments

One or more embodiments described herein include an on-device masking system that utilizes an efficient and flexible neural network model for on-device object detection and instance segmentation. To illustrate, in one or more embodiments, the on-device object detection system implements a neural network having one or more detection heads for object detection. In some cases, each detection head learns to detect objects associated with one or more digital object classes that differ from the digital object classes learned by the other detection heads. Furthermore, the neural network utilizes the detection head(s) to perform class-agnostic object detection. In some implementations, the neural network further includes a masking head that generates an object mask for the detected digital objects. Thus, in some embodiments, the on-device masking system utilizes the neural network as a pipeline to receive a digital image, detect the objects portrayed by the digital image, and generate an object mask for each detected object on the host computing device (e.g., without reliance on an additional device, such as a server).

To provide an illustration, in one or more embodiments, the on-device masking system receives a digital image at a computing device (e.g., the computing device upon which the on-device masking system operates). The on-device masking system detects, at the computing device utilizing a detection head of a detection-masking neural network, a digital object portrayed in the digital image. Further, the on-device masking system generates, at the computing device utilizing a masking head of the detection-masking neural network, an object mask for the digital object.

As just mentioned, in one or more embodiments, the on-device masking system utilizes a detection-masking neural network to provide a pipeline for detecting a digital object within a digital image and generating an object mask for the digital object. For example, in some cases, the detection-masking neural network includes a backbone network (e.g., a neural network encoder) for extracting features from digital images and a series of function-based heads (e.g., neural network decoder heads) for detecting digital objects and generating object masks. Indeed, in one or more embodiments, the detection-masking neural network includes a detection head that detects digital objects within a digital image. In some cases, the detection-masking neural network includes more than one detection head.

To illustrate, in some implementations, the detection-masking neural network includes a multi-branch design having a plurality of detection heads that learn to detect digital objects from a plurality of digital image datasets. In particular, in some embodiments, each detection head learns from a corresponding digital image dataset that differs from the digital image datasets used for the other detection heads. Further, in some instances, each digital image dataset is associated with one or more digital object classes that differ from the digital object classes associated with the other digital image datasets. Thus, the detection-masking neural network learns to detect digital objects from a wide range of object classes.

Further, in one or more embodiments, the detection-masking neural network utilizes the detection head(s) to perform class-agnostic object detection. For instance, in some cases, the detection-masking neural network utilizes the detection head(s) to generate an objectness score that indicates whether a portion of a digital image corresponds to an object generally or corresponds to the background of the digital image.

In one or more embodiments, each detection head of the detection-masking neural network detects digital objects within digital images using at least one multi-scale batch normalization neural network layer. The on-device masking system utilizes the multi-scale batch normalization neural network layer(s) to facilitate on-device implementation of the detection-masking neural network by reducing computational requirements.

Further, in some embodiments, the detection-masking neural network includes a masking head that generates objects masks for the digital objects detected from a digital image. For example, in some implementations, the detection heads identify a plurality of digital objects portrayed in a digital image and the masking head generates at least one object mask for each of the identified digital objects. In some embodiments, the detection-masking neural network generates expanded approximate boundaries (e.g., bounding boxes or rough boundary delineation) corresponding to the identified digital objects and the masking head generates the object masks using the expanded approximate boundaries.

In one or more embodiments, the on-device masking system implements one or more post-processing techniques to determine which of the object masks generated by the detection-masking neural network are to be presented for display on a computing device (e.g., the host computing device). For example, in some instances, the on-device masking system determines a mask quality score for the object masks generated by the detection-masking neural network. Further, in some cases, the on-device masking system utilizes the mask quality scores to determine a set of object masks that will be used for presentation via the computing device. In particular, in some cases, the on-device masking system determines to exclude one or more object masks from presentation based on their corresponding mask quality score and/or other associated attributes.

The on-device masking system provides several advantages over conventional systems. For instance, the on-device masking system operates with improved efficiency when compared to conventional systems. In particular, by implementing multi-scale synchronized batch normalization into the detection heads of the detection-masking neural network, the on-device masking system reduces the number of computations required at inference time when compared to many conventional systems that incorporate group normalization. Thus, the on-device masking system is configured for on-device inference and has a smaller computational footprint compared to conventional object detection and masking systems.

Further, the on-device masking system operates more flexibly than conventional systems. For example, due to the reduced consumption of computing resources, the on-device masking system flexibly performs object detection and instance segmentation on-device. In other words, the on-device masking system enables the host computing device to avoid relying on an additional computing device (e.g., a server) for these operations. In addition, as the detection heads of the detection-masking neural network learn to detect objects from a plurality of digital image datasets associated with a plurality of object classes, the on-device masking system flexibly detects digital objects from a wide range of object instances.

Additionally, the on-device masking system operates more accurately when compared to conventional systems.

To illustrate, by utilizing a wider variety of digital images in learning to detect digital objects, the on-device masking system more accurately detects digital objects that are not explicitly learned. Further, by generating expanded approximate boundaries corresponding to identified digital objects, the on-device masking system generates more accurate object masks without the boundary artifacts that are seen from many conventional systems.

Furthermore, the on-device masking system has improved generalization and accuracy strengths. In particular, the on-device masking system leverages a training strategy that adaptively selects positive and negative samples based on their statistical characteristics. In addition, to further boost the generalization strength of the on-device masking system, a multi-dataset training scheme (see description below) that forces on-device masking system to simultaneously perform well on multiple object detection and instance segmentation datasets. To improve mask quality, the on-device masking system, in one or more implementations, performs one or more of: upsampling of mask predictions during training to benefit from ground-truth masks of higher resolution and quality; artificially expands the detection boxes for use in the mask head to avoid border artifacts; utilizes parallel dilated convolutional layers with different dilation rates for high-resolution mask prediction; and utilizes mask quality prediction to filter out less accurate mask predictions during postprocessing.

In addition to the foregoing, conventional object detection and instance segmentation models are expected to predict the labels based on a predefined set of category labels. By training on data with specific class labels, the models are only able to learn class-specific features which are useful for detecting the objects belonging to such class labels, but cannot generalize well to the objects of unseen classes. To address the above issue, the on-device masking system converts the conventional class-specific object detection task into a class-agnostic task. Instead of having the model learn to predict specific class labels, the on-device masking system treats all detection ground-truth samples as a single object class and distinguishes the single object (positive) class from the background (negative) class. This allows the on-device masking system to learn generic objectness (common properties shared by all kinds of objects), rather than focusing on the fine-grained visual details are used for differentiating between objects of different class labels. Thus, in one or more implementations, the on-device masking system improves flexibility over conventional systems. For example, the on-device masking system is not limited to object types witnessed during training. Rather, the on-device masking system openly segments all objects (and optionally object parts) regardless of classification type or whether the object (or object part) has been witnessed during training.

As illustrated by the foregoing discussion, the present disclosure utilizes a variety of terms to describe features and benefits of the on-device masking system. Additional detail is now provided regarding the meaning of these terms. For example, as used herein, the term "digital object" refers to a distinguishable element depicted in a digital image. To illustrate, in some embodiments, a digital object includes a person, an item, a natural object (e.g., a tree or rock formation) or a structure depicted in a digital image. In some instances, a digital object refers to a plurality of elements that, collectively, can be distinguished from other elements depicted in a digital image. For example, in some instances, a digital object includes a collection of buildings that make up a skyline. In some instances, a digital object more broadly includes a (portion of a) foreground or other element(s) depicted in a digital visual media item as distinguished from a background.

In one or more embodiments, a digital object is associated with at least one digital object class. As used herein, the term "digital object class" refers to a classification or type of digital object. In particular, in some embodiments, a digital object class refers to a grouping of digital objects based on one or more attributes that are common to the included digital objects. To illustrate, in some cases, a digital object class includes, but is not limited to, a class corresponding to dogs, cats, people, cars, boats, birds, buildings, fruit, phones, or computer devices. The generalization of a digital object class with respect to its included digital objects varies in different embodiments. Relatedly, as used herein, the term "class label" refers to a label or tag associated with a digital object based on a corresponding digital object class.

As used herein the term "digital image dataset" includes a collection of digital images. In particular, in some embodiments, a digital image dataset includes a set of digital images that portray at least one digital object. In some implementation, a digital image dataset corresponds to one or more digital object classes. For example, in some cases, the digital images of a digital image dataset portray at least one digital object corresponding to a common digital object class (e.g., associated with a common class label).

Additionally, as used herein, the term "object mask" refers to a demarcation useful for partitioning a digital image into separate portions. In particular, in some embodiments, an object mask refers to an identification of a portion of the digital image (i.e., pixels of the digital image) belonging to one or more digital objects and a portion of the digital image belonging to a background and/or other objects. For example, in some embodiments, an object mask includes a map of a digital image that has an indication for each pixel of whether the pixel corresponds to part of a digital object or not. In some implementations, the indication includes a binary indication (e.g., a "1" for pixels belonging to the digital object and a "0" for pixels not belonging to the digital object). In alternative implementations, the indication includes a probability (e.g., a number between 1 and 0) that indicates the likelihood that a pixel belongs to a digital object. In such implementations, the closer the value is to 1, the more likely the pixel belongs to a digital object and vice versa.

As used herein, the term "neural network" refers to a type of machine learning model, which can be tuned (e.g., trained) based on inputs to approximate unknown functions used for generating the corresponding outputs. In particular, in some embodiments, a neural network refers to a model of interconnected artificial neurons (e.g., organized in layers) that communicate and learn to approximate complex functions and generate outputs based on a plurality of inputs provided to the model. In some instances, a neural network includes one or more machine learning algorithms. Further, in some cases, a neural network includes an algorithm (or set of algorithms) that implements deep learning techniques that utilize a set of algorithms to model high-level abstractions in data. To illustrate, in some embodiments, a neural network includes a convolutional neural network, a recurrent neural network (e.g., a long short-term memory neural network), a generative adversarial neural network, a graph neural network, or a multi-layer perceptron. In some embodiments, a neural network includes a combination of neural networks or neural network components.

Additionally, as used herein, the term "detection-masking neural network" refers to a computer-implemented neural network that generates object masks for digital objects portrayed in digital images. In particular, in some embodiments, a detection-masking neural network refers to a computer-implemented neural network that detects digital objects within digital images and generates object masks for the digital objects. Indeed, in some implementations, a detection-masking neural network includes a neural network pipeline that analyzes a digital image, identifies one or more digital objects portrayed in the digital image, and generates an object mask for the one or more digital objects.

Further, as used herein, the term "detection head" refers to a neural network component that detects digital objects portrayed within digital images. In particular, in some embodiments, a detection head refers to a set of one or more neural network layers that detect digital objects portrayed within digital images. For example, in some cases, a detection head refers to a neural network decoder that detects digital objects from a digital image based on encodings of the digital image. In some implementations, a detection head detects digital objects that correspond to one or more digital object classes.

As used herein, the term "masking head" refers to a neural network component that generates objects masks for digital objects. For example, in some cases, a masking head refers to a set of one or more neural network layers that generate objects masks for digital objects. For example, in some cases, a masking head refers to a neural network decoder that generates object masks for digital objects identified from a digital image.

Additionally, as used herein, the term "parameter" refers to a variable that is internal to a computer-implemented model, such as a detection-masking neural network. In particular, in some embodiments, a parameter refers to a variable that affects the operation of the corresponding computer-implemented model. For instance, in some cases, a parameter includes a weight of a function of a computer-implemented model that affects the outcome generated by the model. In some cases, a parameter is associated with a particular component of the computer-implemented model. For instance, in some implementations, a parameter is associated with a detection head or a masking head of a detection-masking neural network. Relatedly, as used herein, the term "convolutional parameter" refers to a parameter corresponding to a convolutional layer of a neural network. Similarly, as used herein, the term "output parameter" refers to a parameter corresponding to an output layer of a neural network or a neural network component. For instance, in some cases, an output parameter corresponds to an output layer of a detection head or a masking head of a detection-masking neural network.

Further, as used herein, the term "multi-scale synchronized batch normalization neural network layer" refers to a neural network layer that performs batch normalization across various feature maps. In particular, in some embodiments, a multi-scale synchronized batch normalization neural network layer refers to a neural network layer that performs synchronized batch normalization for feature maps corresponding to various levels of image features. As an example, in some cases, a multi-scale synchronized batch normalization neural network layer includes a neural network layer that normalizes features across two dimensions at the same time: multiple pyramid levels of feature maps and multiple graphics processing units (GPUs).

As used herein, the term "objectness score" refers to a value indicating whether a digital image portrays a digital object. In particular, in some embodiments, an objectness score refers to a score or other quantitative value that corresponds to a portion of a digital image and indicates whether the portion of the digital image includes a digital object. In one or more embodiments, an objectness score is class-agnostic (e.g., is a "class-agnostic objectness score). In other words, the objectness score indicates whether a portion of a digital image corresponds to a digital object generally (e.g., rather than a digital object of a particular object class) or the background.

Additionally, as used herein, the term "approximate boundary" refers to a boundary that approximates a digital object within a digital image. In particular, in some embodiments, an approximate boundary refers to a boundary that approximates the outline or outer edge of a digital object portrayed within a digital image (e.g., a boundary delineation). Alternatively, in some cases, an approximate boundary refers to a bounding box or some other shape that encloses the digital object. In some implementations, an approximate boundary closely follows the contours of the outline of a digital object. Relatedly, as used herein, the term "expanded approximate boundary" refers to an approximate boundary that has been generated from another approximate boundary and is larger than the other approximate boundary in at least one dimension.

Additional detail regarding the on-device masking system will now be provided with reference to the figures. For example, FIG. 1 illustrates a schematic diagram of an exemplary system 100 in which an on-device masking system 106 (also optionally referred to herein as DOMO or Detect Object Mask Object). As illustrated in FIG. 1, the system 100 includes a server(s) 102, a network 108, and client devices 110a-110n.

Although the system 100 of FIG. 1 is depicted as having a particular number of components, the system 100 is capable of having any number of additional or alternative components (e.g., any number of servers, client devices, or other components in communication with the on-device masking system 106 via the network 108). Similarly, although FIG. 1 illustrates a particular arrangement of the server(s) 102, the network 108, and the client devices 110a-110n, various additional arrangements are possible.

The server(s) 102, the network 108, and the client devices 110a-110n are communicatively coupled with each other either directly or indirectly (e.g., through the network 108 discussed in greater detail below in relation to FIG. 11). Moreover, the server(s) 102 and the client devices 110a-110n include one of a variety of computing devices (including one or more computing devices as discussed in greater detail with relation to FIG. 11).

As mentioned above, the system 100 includes the server(s) 102. In one or more embodiments, the server(s) 102 generates, stores, receives, and/or transmits data including neural networks, digital images, object masks, and modified digital images. In one or more embodiments, the server(s) 102 comprises a data server. In some implementations, the server(s) 102 comprises a communication server or a web-hosting server.

In one or more embodiments, the image editing system 104 provides functionality by which a user (e.g., a user of one of the client devices 110a-110n) generates, edits, manages, and/or stores digital images. For example, in some instances, a user utilizes a client device to send a digital image to the image editing system 104 hosted on the server(s) 102 via the network 108. The image editing system 104 then provides many options that the user may use to edit the digital image, store the digital image, and subsequently search for, access, and view the digital image.

In one or more embodiments, the client devices 110*a*-110*n* include computing devices that can access, edit, segment, modify, store, and/or provide, for display, digital images. For example, the client devices 110*a*-110*n* include smartphones, tablets, desktop computers, laptop computers, head-mounted-display devices, or other electronic devices. The client devices 110*a*-110*n* include one or more applications (e.g., the image editing application 112) that can access, edit, segment, modify, store, and/or provide, for display, digital images. For example, in one or more embodiments, the image editing application 112 includes a software application installed on the client devices 110*a*-110*n*. Additionally, or alternatively, the image editing application 112 includes a software application hosted on the server(s) 102 (and supported by the image editing system 104), which may be accessed by the client devices 110*a*-110*n* through another application, such as a web browser.

To provide an example implementation, in some embodiments, the on-device masking system 106 on the server(s) 102 supports the on-device masking system 106 on the client device 110*n*. For instance, in some cases, the on-device masking system 106 on the server(s) 102 learns parameters for the detection-masking neural network. The on-device masking system 106 then, via the server(s) 102, provides the detection-masking neural network to the client device 110*n*. In other words, the client device 110*n* obtains (e.g., downloads) the detection-masking neural network with the learned parameters from the server(s) 102. Once downloaded, the on-device masking system 106 on the client device 110*n* utilizes the detection-masking neural network to detect digital objects and generate corresponding object masks independent from the server(s) 102.

In alternative implementations, the on-device masking system 106 includes a web hosting application that allows the client device 110*n* to interact with content and services hosted on the server(s) 102. To illustrate, in one or more implementations, the client device 110*n* accesses a web page supported by the server(s) 102. For example, the client device 110*n* provides a digital image to the server(s) 102, and, in response, the on-device masking system 106 on the server(s) 102 generates one or more object masks. The server(s) 102 then provides the object mask(s) to the client device 110*n* for display or editing of the digital image.

Indeed, the on-device masking system 106 is able to be implemented in whole, or in part, by the individual elements of the system 100. Indeed, although FIG. 1 illustrates the on-device masking system 106 implemented with regard to the server(s) 102, different components of the on-device masking system 106 are able to be implemented by a variety of devices within the system 100. For example, one or more (or all) components of the on-device masking system 106 are implemented by a different computing device (e.g., one of the client devices 110*a*-110*n*) or a separate server from the server(s) 102 hosting the image editing system 104. Indeed, as shown in FIG. 1, the client devices 110*a*-110*n* include the on-device masking system 106. Example components of the on-device masking system 106 will be described below with regard to FIG. 9.

In one or more embodiments, the on-device masking system 106 operates to enable selection of a digital object portrayed within a digital image and viewing of a corresponding object mask. In particular, as mentioned above, in some cases, the on-device masking system 106 detects digital objects portrayed within a digital image and generates corresponding object masks (e.g., on the host computing device, such as a client device). Further, in some embodiments, the on-device masking system 106 provides an object mask for a digital object in response to a selection of the digital object via the computing device. FIGS. 2A-2E illustrates an overview diagram of the on-device masking system 106 facilitating the provision of object masks corresponding to selected digital objects in accordance with one or more embodiments.

As shown in FIG. 2A, the on-device masking system 106 provides a digital image 208 for display within a graphical user interface 204 of a computing device 206 (e.g., a client device). Further, the on-device masking system 106 provides a selectable option 202 for an auto masking tool within the graphical user interface 204. In one or more embodiments, in response to receiving a user selection of the selectable option 202, the on-device masking system 106 detects digital objects portrayed within the digital image 208 and generates corresponding object masks for the detected digital objects as will be explained in more detail below. In some embodiments, the on-device masking system 106 detects and generates the objects masks on the computing device 206 (e.g., without relying on the computing resources of a separate device, such as a server, to perform these operations).

Figure 2B:
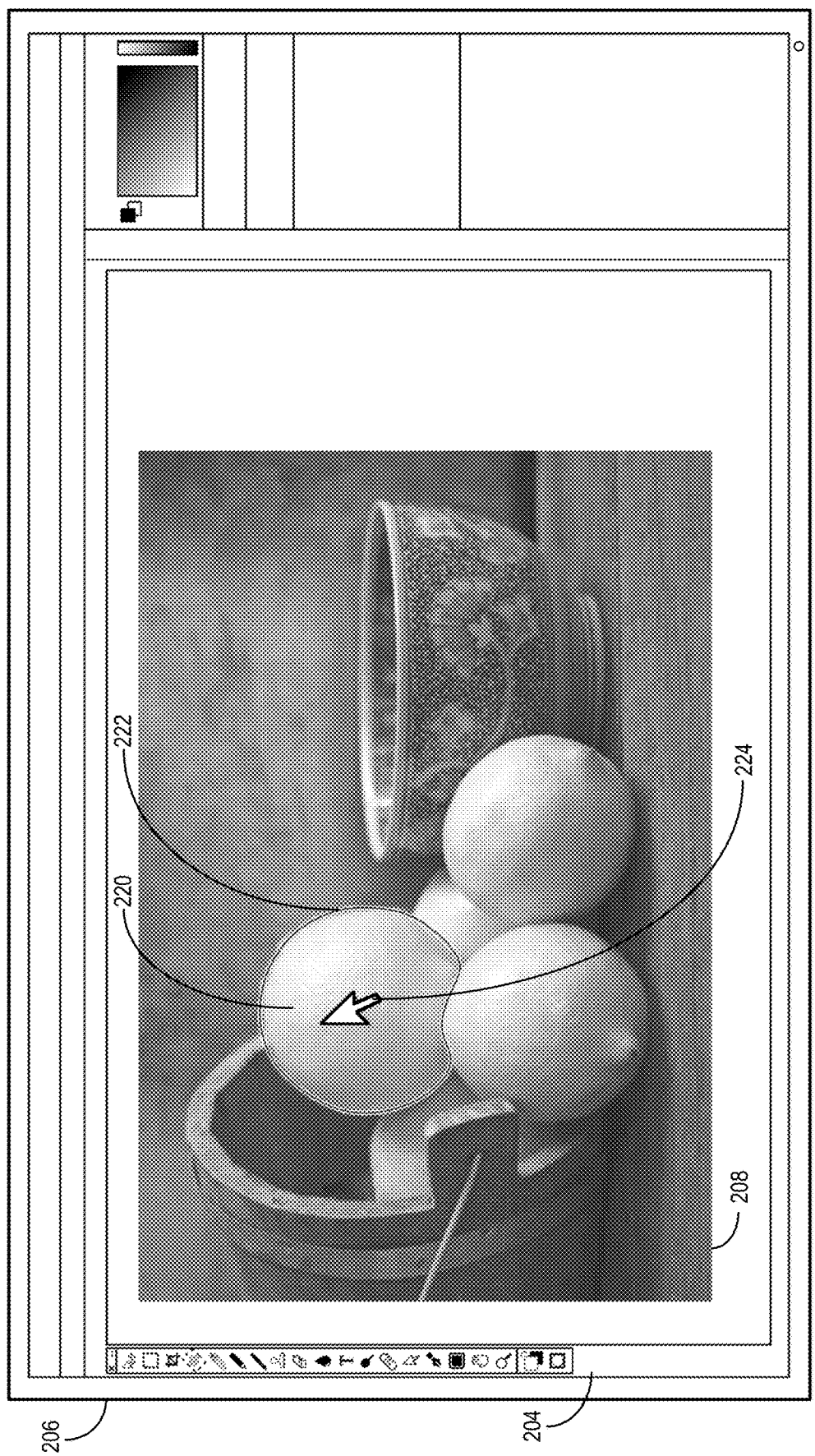

As shown in FIG. 2B, in response to detection of a selection of a digital object 220 (e.g., a lemon) portrayed within the digital image 208, the on-device masking system 106 provides an object mask 222 for the digital object 220 for display. For example, in some cases, the on-device masking system 106 detects the selection of the digital object 220 via a hovering of the cursor 224 over the digital object 220, a click of the cursor 224 while positioned over the digital object 220, or a short/light tap gesture of the digital object 220, and then provides the corresponding object mask 222.

Figure 2C:
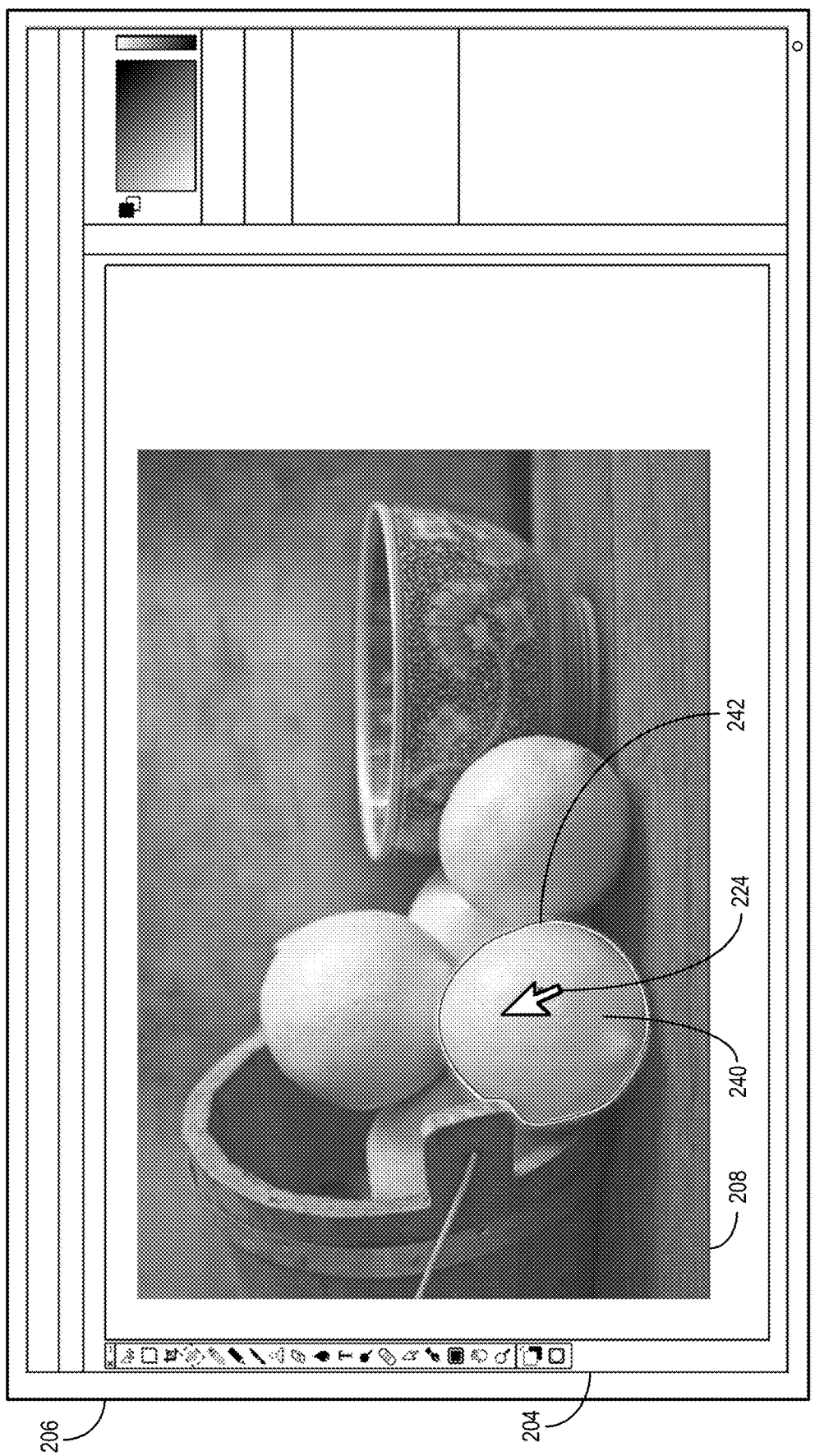
Figure 2D:
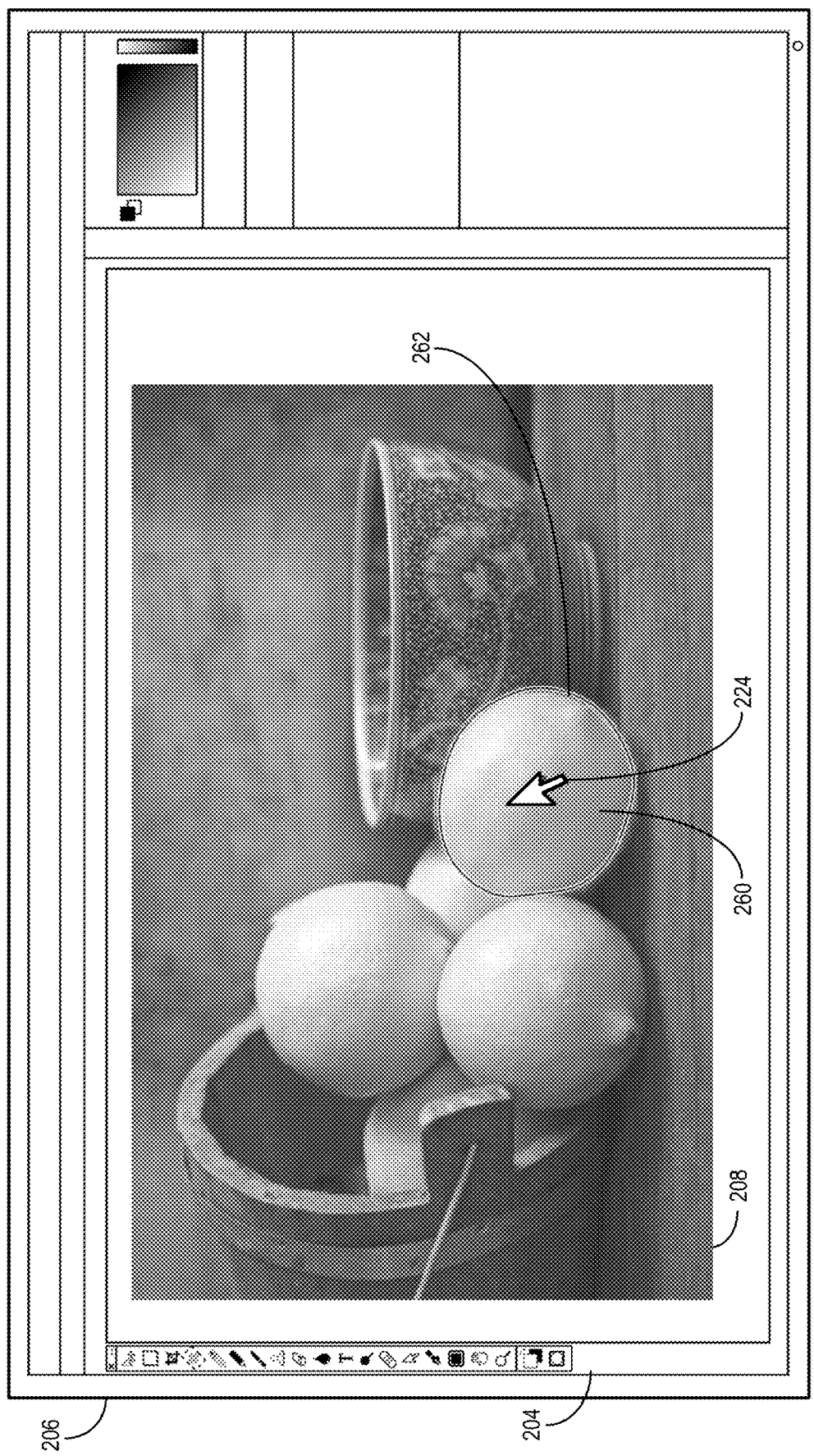

FIG. 2C illustrates that, in response to detecting selection of another digital object 240 portrayed within the digital image 208 (e.g., via movement of the cursor 224 to the other digital object 240 or some other gesture indicating selection of the other digital object 240), the on-device masking system 106 provides a corresponding object mask 242 for display. Further, the on-device masking system 106 removes the object mask 222 corresponding to the digital object 220. Similarly, as shown in FIG. 2D, the on-device masking system 106 provides an object mask 262 corresponding to a third digital object 260 portrayed in the digital image 208 in response to a selection of the digital object 260 (e.g., via movement of the cursor 224 to the digital object 260).

Figure 2E:
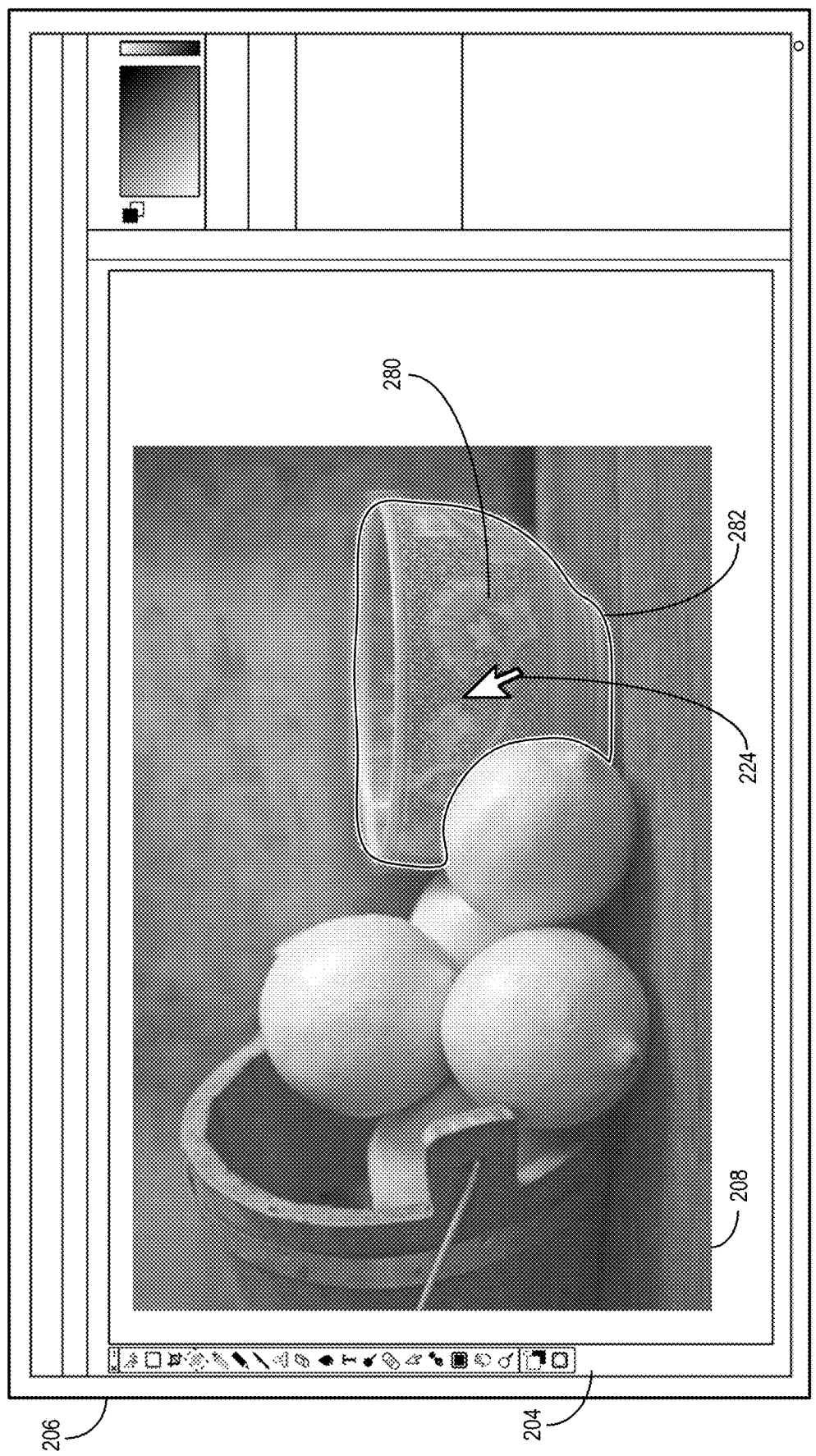

FIG. 2E also shows the on-device masking system 106 providing an object mask 282 corresponding to a digital object 280 in response to detecting a selection of the digital object 280. It should be noted, however, that the digital object 280 (a bowl) differs from the digital objects 220, 240, 260 (lemons) portrayed in the digital image 208. Indeed, as will be explained in more detail below, the on-device masking system 106 detects a wide variety of digital objects portrayed by a digital image and generates their corresponding objects masks. Further, in some instances, the on-device masking system 106 detects every digital object portrayed in a digital image and generates a corresponding objects mask (e.g., performs panoptic segmentation).

As suggested above, the on-device masking system 106 generates objects masks for digital objects portrayed in a digital image using little (if any) user input. Indeed, in some instances, the on-device masking system 106 performs the object detection and mask generation for digital objects in a digital image before selection of one of the digital objects by a user. Though the discussion above indicates that the object detection and mask generation occurs in response to selection of an automatic masking tool, the on-device masking system 106, in one or more implementations, performs the object detection and mask generation without such a selection (e.g., in response to receiving the digital image), further reducing the user input required.

Figures 3A, 3B:
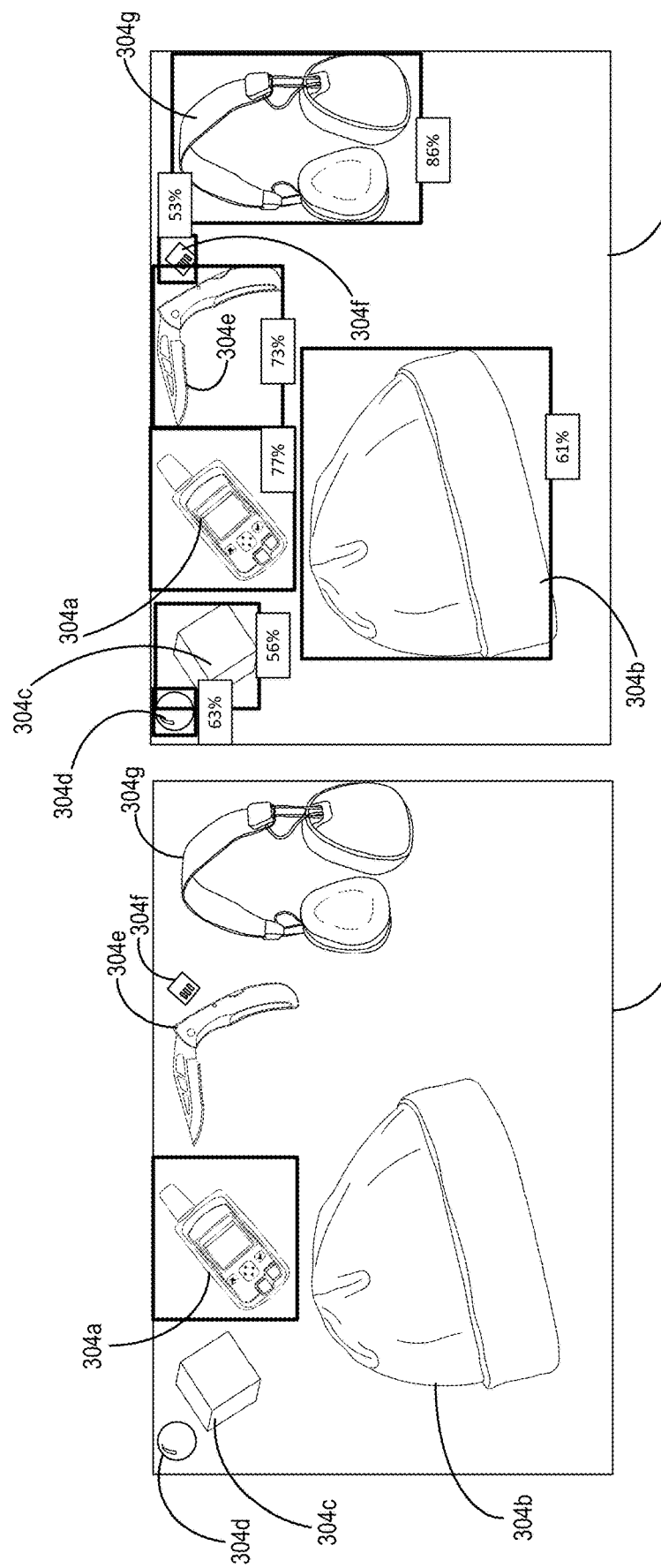
FIGS. 3A-3B illustrate a visual comparison of detection results obtained by class-specific object detection and class-agnostic object detection in accordance with one or more embodiments.

As previously mentioned, in one or more embodiments, the on-device masking system 106 detects a wide variety of digital objects within a digital image. In particular, the on-device masking system 106 detects digital objects associated with a wide variety of object classes. In some embodiments, the on-device masking system 106 implements class-agnostic object detection to detect a digital object within a digital image regardless of its associated digital object class. FIGS. 3A-3B illustrate a visual comparison of the detection results obtained by the class-specific object detection performed by many conventional systems and the class-agnostic object detection performed by the on-device masking system 106 in accordance with one or embodiments.

As shown in FIG. 3A, class-specific object detection results in the detection of a digital object 304*a* of a digital image 302 that correspond to a particular digital object class (e.g., a smartphone or handheld device class). In some cases, class-specific object detection results in the detection of multiple digital objects within a digital image, but the digital objects are all associated with a predefined set of digital object classes. Indeed, many conventional systems learn a classifier that classifies a region of a digital image into one of N+1 digital object classes where $N \in \mathbb{R}$ is the number of predefined class labels and 1 corresponds to a background class. As illustrated by FIG. 3A, however, if a digital image portrays other digital objects that are not associated with the N+1 digital object classes (e.g., the digital objects 304*b*, 304*c*, 304*d*, 304*e*, 304*f*, 304*g*), the class-specific object detection typically fails to detect these objects.

By comparison, the on-device masking system 106 classifies a region of a digital image into one of two classes: an object class and a background class. To accomplish this, the on-device masking system 106 treats all detection ground truths samples as a single object class and enables the detection-masking neural network to learn to distinguish the object class from the background class using generic objectness features (e.g., common properties shared by all types of digital objects) as will be discussed in more detail below. Accordingly, the on-device masking system 106 converts the conventional class-specific object detection into a class-agnostic detection task. As the detection results of FIG. 3B show, by using the class-agnostic approach to object detection, the on-device masking system 106 detects the objects 304*a*-304*g* within the digital image regardless of their associated digital object class.

By implementing class-agnostic (objectness) detection, the on-device masking system 106 operates more flexibly than conventional systems. Indeed, as seen by the comparison of the detection results illustrated by FIGS. 3A-3B, the on-device masking system 106 flexibly detects digital objects associated with a wider range of digital object classes when compared to many conventional systems. Thus, in many cases, the on-device masking system 106 flexibly detects more digital objects within a digital image.

Figure 4A:
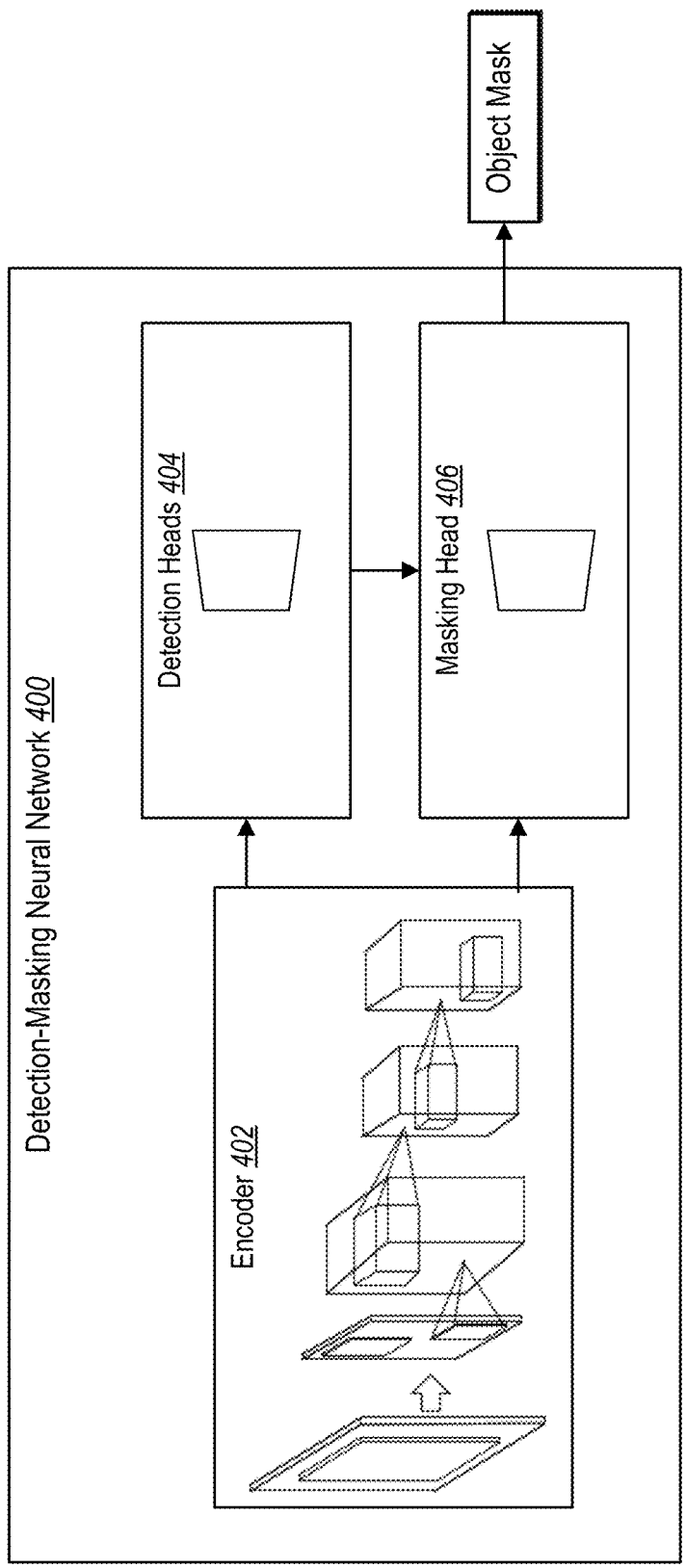
FIGS. 4A-4D illustrate a neural network architecture of a detection-masking neural network utilized by the on-device masking system to perform object detection and mask generation in accordance with one or more embodiments.
Figure 4B:
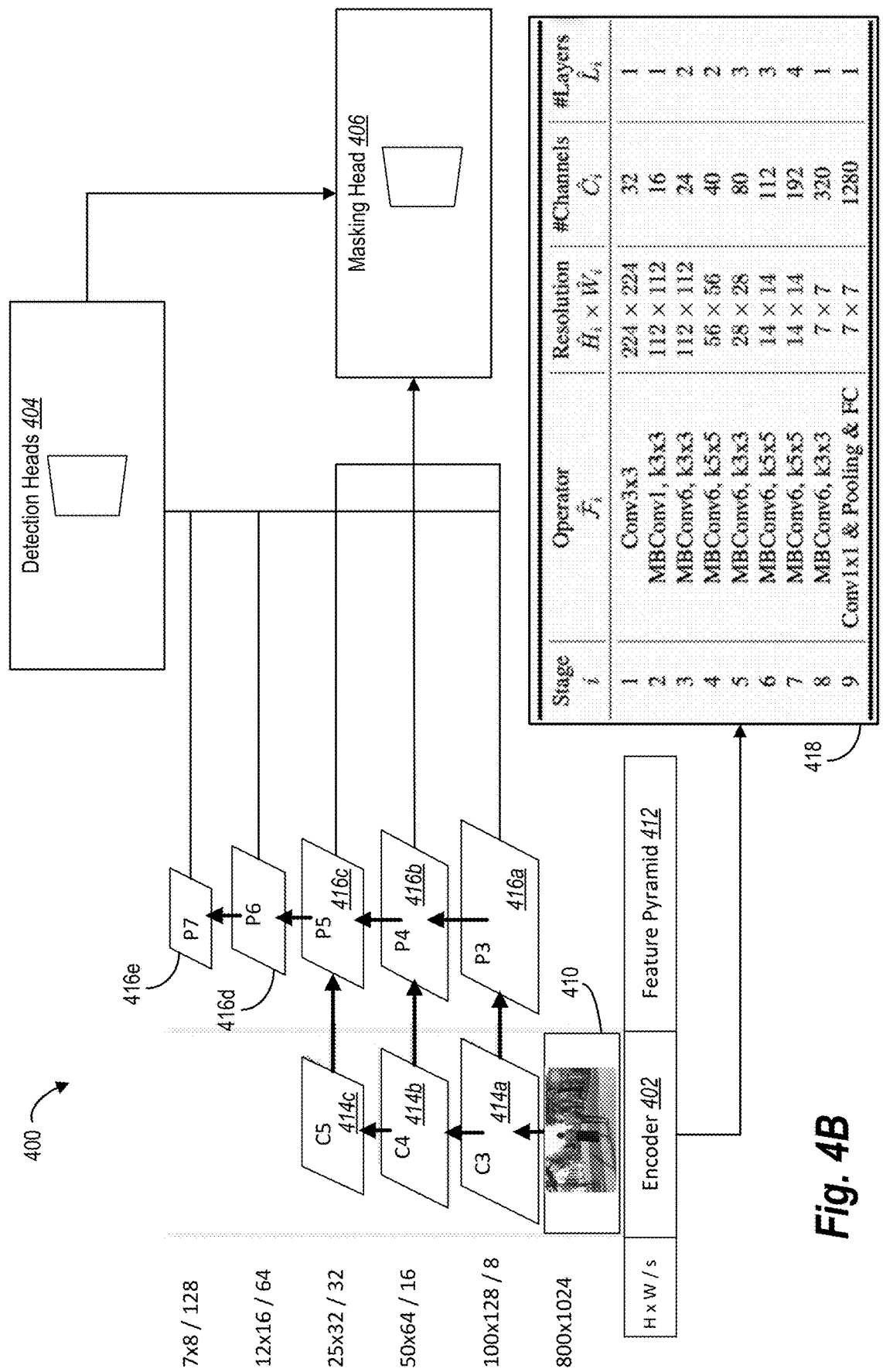
Figure 4C:
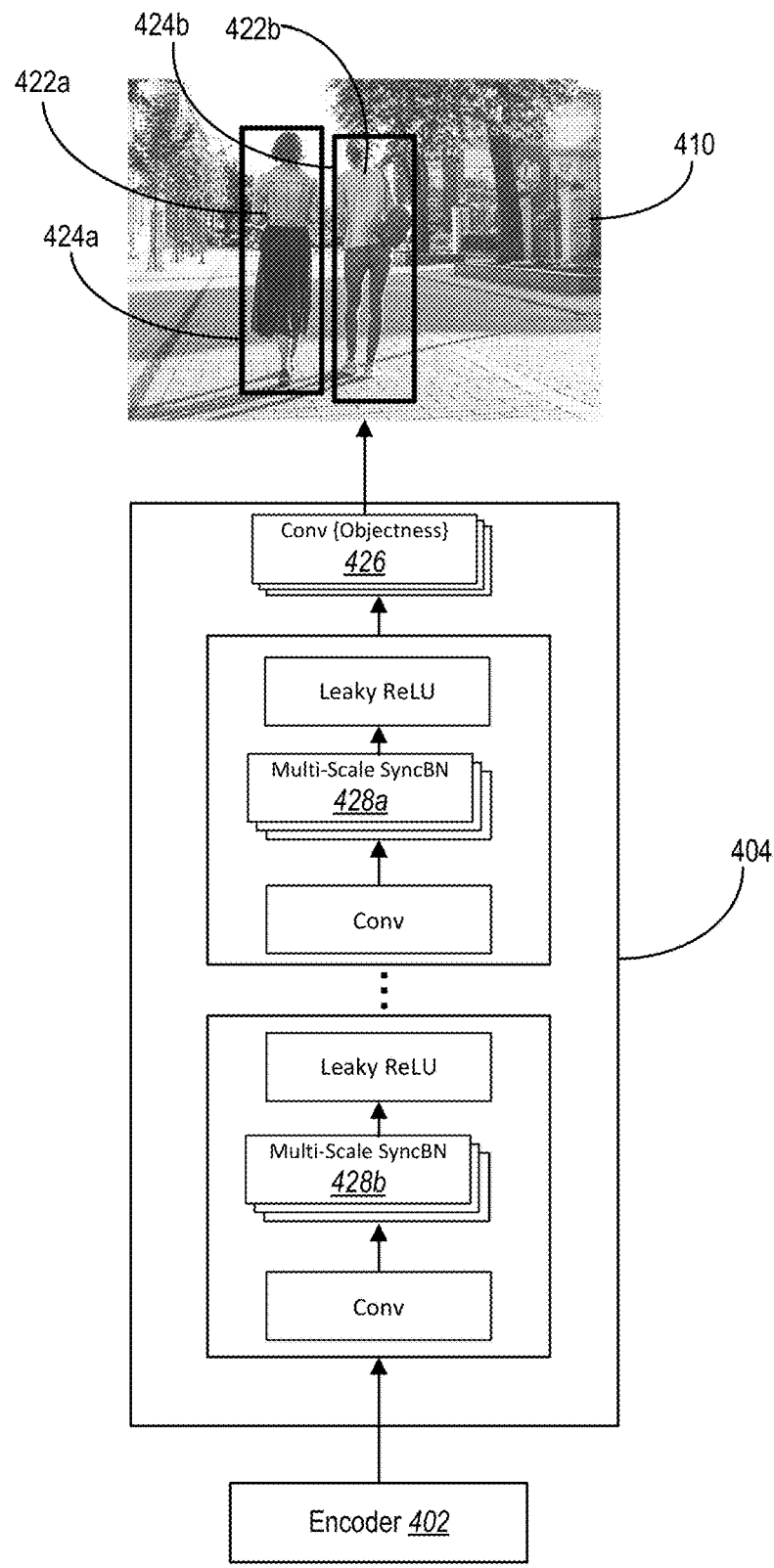
Figure 4D:
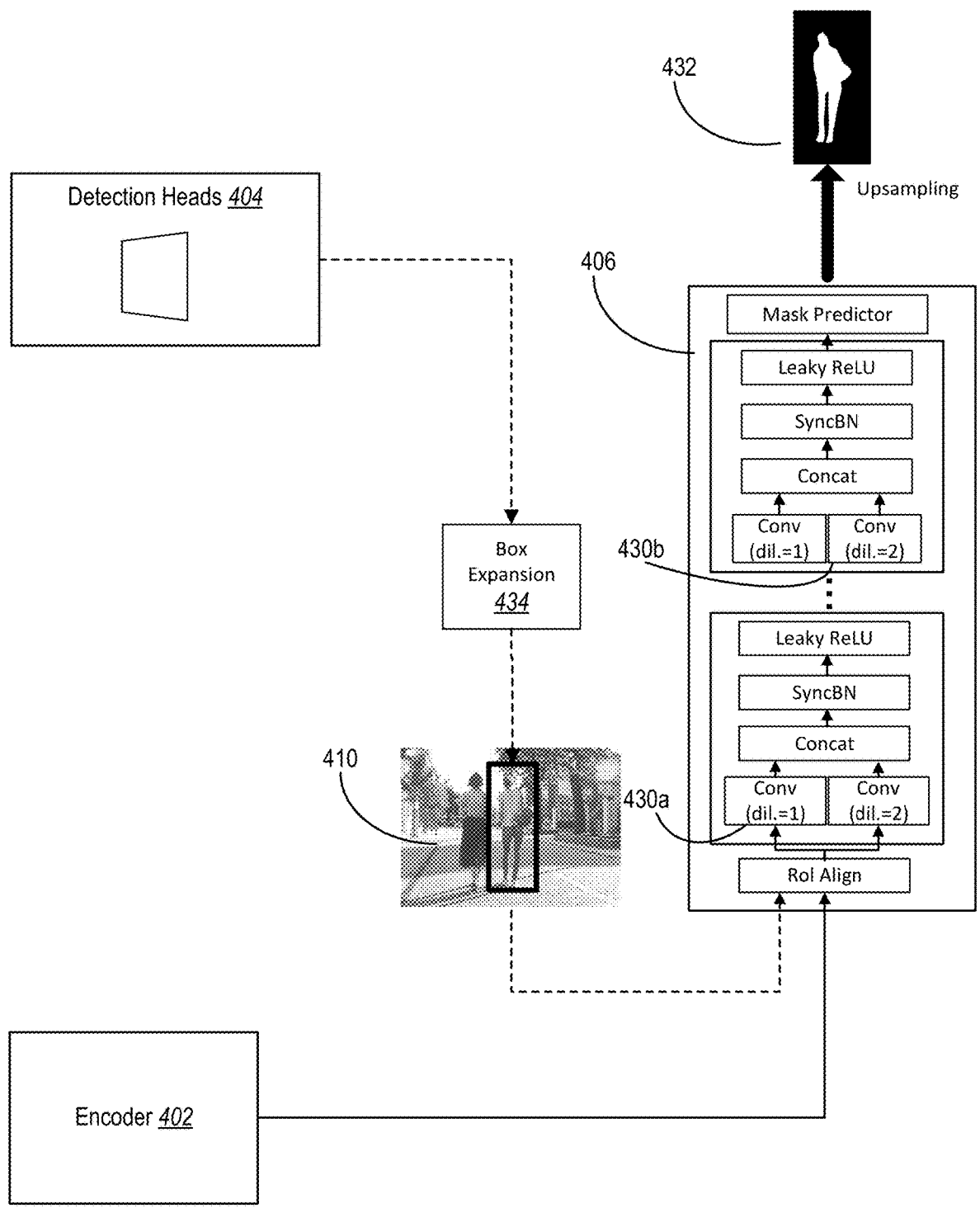

As mentioned above, the on-device masking system 106 utilizes a detection-masking neural network to detect digital objects within a digital image and to generate object masks for the detected digital objects. FIGS. 4A-4D illustrate a detection-masking neural network utilized by the on-device masking system 106 to perform object detection and mask generation in accordance with one or more embodiments. In particular, FIG. 4A illustrates a broad overview of the architecture of the detection-masking neural network. FIGS. 4B-4D illustrate more detail regarding the architecture and connectivity of the various components of the detection-masking neural network in accordance with one or more embodiments.

Indeed, as shown in FIG. 4A, a detection-masking neural network 400 includes a neural network encoder 402 having a backbone network, detection heads 404 (or neural network decoder head), and a masking head 406 (or neural network decoder head). The neural network encoder 402 encodes a digital image and provides the encodings to the detection heads 404 and the masking head 406 as shown in FIG. 4A. The detection heads 404 utilize the encodings to detect one or more digital objects portrayed within the digital image. The masking head 406 generates at least one object mask for each of the detected digital objects.

FIG. 4B illustrates utilizing the neural network encoder 402 of the detection-masking neural network 400 to encode a digital image in accordance with one or more embodiments. As indicated by FIG. 4B, the neural network encoder 402 includes a backbone network that analyzes a digital image 410. Based on the analysis, the neural network encoder 402 generates a feature pyramid 412 (e.g., a plurality of feature maps at different resolutions so that the feature maps capture different levels of image features from the digital image 410).

For instance, as shown, the neural network encoder 402 generates feature maps 414*a*, 141*b*, 414*c* from the digital image 410. The neural network encoder 402 utilizes the feature maps 414*a*-414*c* to generate feature maps 416*a*-416*e* within the feature pyramid 412. For example, in some embodiments, the neural network encoder 402 generates the feature maps 416*a*, 416*b*, 416*c* directly from the feature maps 414*a*-414*c*, respectively, using a convolutional layer with top-down connections. In some cases, the neural network encoder 402 generates the feature map 416*d* from the feature map 416*c* using a convolutional layer with a stride of two. Similarly, in some instances, the neural network encoder 402 generates the feature map 416*e* from the feature map 416*d* using a convolutional layer with a stride of two.

As illustrated in FIG. 4B, the neural network encoder 402 provides the feature maps 416*a*-416*e* of the feature pyramid 412 to the detection heads 404 for the detection of digital objects within the digital image 410 and to the masking head 406 for generation of object masks for the detected digital objects.

The table 418 shown in FIG. 4B illustrates the architecture of the neural network encoder 402 in accordance with one or more embodiments (e.g., the architecture used to generate the feature maps 414*a*-414*c*). For example, in one or more embodiments, the on-device masking system 106 utilizes, as the neural network encoder 402, the EfficientNet-B0 backbone network described by Mingxing Tan and Quoc Le, *EfficientNet: Rethinking Model Scaling for Convolutional Neural Networks*, in International Conference on Machine Learning, pp. 6105-6114, PMLR, 2019, which is incorporated herein by reference in its entirety.

By utilizing the neural network encoder 402 as described above to generate feature maps from a digital image, the on-device masking system 106 operates more efficiently than many conventional systems. Indeed, the neural network encoder 402 includes a smaller computational footprint when compared to backbone networks utilized by many conventional systems (e.g., the ResNet-50 network). Thus, using the neural network encoder 402 reduces the computing resources required to generate feature maps from a digital image. This further leads to improved flexibility as the reduced computations allow for deployment of the on-device masking system 106 on computing devices with limited resources (e.g., client devices).

FIG. 4C illustrates the architecture of the detection heads 404 of the detection-masking neural network 400 in accordance with one or more embodiments. As shown by FIG. 4C, the detection heads 404 include a plurality of neural network layers. As further shown, the detection heads 404 include multiple output layers 426, one for each detection head. Similarly, the detection heads 404 include multiple multi-scale synchronized batch normalization neural network layers 428a-428b, one or more for each detection head.

Indeed, in one or more embodiments, the detection-masking neural network 400 shares one or more neural network layers between the detection heads 404. For instance, FIG. 4C illustrates the detection heads sharing the intermediate convolutional neural network layers as well as the leaky rectified linear unit (ReLU) neural network layers. Sharing these layers among the detection heads 404 allow the detection-masking neural network 400 to remain light-weight as they are computationally demanding layers that make up the majority of the parameters for a detection head in some cases. In some implementations, sharing a neural network layer between detection heads includes sharing the parameters of the neural network layer between the detection heads.

Additionally, in one or more embodiments, the detection heads 404 each include a separate set of multi-scale synchronized batch normalization neural network layers 428a-428b. In other words, the on-device masking system 106 learns separate parameters for different detection heads. Indeed, given a channel number $C \in \mathbb{R}$, a batch normalization layer includes 2C learnable parameters while a commonly used 3×3 convolutional neural network layer learns C×C×3×3 learnable parameters. As such, multi-scale synchronized batch normalization neural network layers are relatively lightweight, and the on-device masking system 106 utilizes the separate multi-scale synchronized batch normalization neural network layers for each detection head without significantly increasing the computational footprint of the detection-masking neural network 400.

In one or more embodiments, the detection heads 404 utilize the multi-scale synchronized batch normalization neural network layers 428a-428b to normalize the feature maps across all levels of the feature pyramid generated by the neural network encoder 402 and across all GPUs. Indeed, in some implementations, the detection heads 404 utilize the multi-scale synchronized batch normalization neural network layers 428a-428b to normalize features across both dimensions at the same time.

As an example, in one or more embodiments, the detection-masking neural network 400 utilizes the multi-scale synchronized batch normalization neural network layers 428a-428b to compute normalization statistics (means and variances) from data samples across multiple GPUs. To illustrate, while learning parameters (e.g., during training), the detection heads 404 utilize the multi-scale synchronized batch normalization neural network layers 428a-428b compute the global mean (denoted M) and the squared mean (denoted P) as follows:

$$M = \sum_{i=1}^{|G|} \sum_{j=1}^{|S|} \frac{\mu_{ij}}{|G||S|} \quad (1)$$

$$P = \sum_{i=1}^{|G|} \sum_{j=1}^{|S|} \frac{\mu_{ij}\mu_{ij}}{|G||S|} \quad (2)$$

In equations 1-2, |G| represent the number of GPUs and |S| represents the number of levels in the feature pyramid generated by the neural network encoder 402. Additionally, $\mu_{ij} \in \mathbb{R}$ represents the scalar mean of a single feature channel computed with the i-th GPU and at the j-th pyramid level. The multi-scale synchronized batch normalization neural network layers 428a-428b determine the global variance V=P−MM and use the global mean (M) and global variance (V) to normalize the feature maps of the pyramid levels, across the GPUs. In one or more embodiments, the multi-scale synchronized batch normalization neural network layers 428a-428b use a single set of running statistics for each feature channel.

Accordingly, at inference time, the detection-masking neural network 400 maintains full parameter shareability for a detection head for all pyramid levels. Thus, while, in some embodiments, the detection-masking neural network 400 learns separate multi-scale synchronized batch normalization neural network layers for each detection head, it utilizes the multi-scale synchronized batch normalization neural network layers of a detection head for multiple pyramid levels.

By utilizing multi-scale synchronized batch normalization neural network layers, the on-device masking system 106 operates more efficiently than many conventional systems. Indeed, as previously mentioned, many conventional systems utilize group normalization for object detection, which introduces additional computational operations. Thus, utilizing multi-scale synchronized batch normalization reduces the computations required for object detection while allowing for multi-scale operation. The improved efficiency facilitates flexible deployment of the on-device masking system 106 on computing devices with relatively few resources.

Further, as mentioned, in one or more embodiments, the detection heads 404 each include a separate output layer (e.g., the last layer of the detection head). Indeed, as previously discussed, and as will be discussed in more detail below, the on-device masking system 106 utilizes separate digital image datasets to learn the parameters for the detection heads 404 in some implementations. Thus, by keeping the output layers 426 separate for each detection head, the detection-masking neural network 400 maintains a neural network layer that is tuned from a particular digital image dataset—the digital image dataset corresponding to the output layer's detection head. Further, the detection-masking neural network 400 ensures that distinct output spaces that exist independently of each other are learned.

As discussed above, the detection-masking neural network 400 utilizes the detection heads 404 to detect digital objects 422a, 422b, 422c within the digital image 410. In particular, in one or more embodiments, the detection heads 404 utilize the feature maps of the feature pyramid generated by the neural network encoder 402 to detect the digital objects 422a-422c. In some cases, by utilizing the feature pyramid enables the detection heads 404 and the other detection heads to detect objects of different sizes portrayed by a digital image. For example, in some cases, the detection heads 404 utilizes the smallest feature map from the feature pyramid to detect relatively large objects and utilizes the largest feature map (e.g., the lowest level on the feature pyramid) to detect relatively small objects. Accordingly, the detection heads 404 utilizes the feature pyramid to improve detection flexibility.

In one or more embodiments, the detection-masking neural network 400 utilizes the detection heads 404 to detect digital objects within a digital image by utilizing each detection head to generate an objectness score for a region of a digital image. Indeed, in some embodiments, while each detection head learns detection from a particular digital image dataset associated with one or more digital object classes, the detection head generates an objectness score for a region of a digital image at inference time. In some cases, however, because each detection head learns detection based on one or more digital object classes that differ from the digital object classes used for the other detection heads, the objectness score generated by each detection head for a region of a digital image may differ. For example, in some cases, a detection head that learned on an object class will generate a higher objectness score for a region containing a digital object from that object class than a detection head that learned on a significantly different object class.

Thus, in some embodiments, the detection-masking neural network 400 utilizes the objectness score generated by each of the detection heads to determine whether a region of a digital image includes a digital object. For example, in some cases, the detection-masking neural network 400 utilizes a detection threshold to determine whether the objectness scores indicate that a region includes a digital object. To illustrate, in some cases, the detection-masking neural network 400 determines that a region includes a digital image if a threshold number of detection heads generate an objectness score for the region that satisfies the detection threshold. In some embodiments, the detection-masking neural network 400 determines whether an average or a combination (e.g., a sum) of the objectness scores satisfies the detection threshold. In some implementations, the detection-masking neural network 400 applies a weighting to each of the objectness scores and utilizes the weighted objectness scores in determining whether a region includes a digital object. In some implementations, the detection-masking neural network 400 utilizes the objectness scores from a subset of the detection heads 404 to determine whether a region includes a digital object.

As shown, the detection-masking neural network 400 (e.g., the detection heads 404) generates approximate boundaries 424a, 424b, 424c for the digital objects 442a-442c that are detected within the digital image 410. In particular, in one or more implementations, the approximate boundaries 424a-424c comprise bounding boxes as shown in FIG. 4C.

FIG. 4D illustrates the architecture of the masking head 406 of the detection-masking neural network 400 in accordance with one or more embodiments. As shown in FIG. 4D, the masking head 406 includes a plurality of neural network layers. Notably, the masking head 406 includes pairs of parallel dilated convolutional layers (e.g., the pairs 430a-430b of parallel dilated convolutional neural network layers). As shown in FIG. 4D, the convolutional layers in each of the pairs of parallel dilated convolutional neural network layers use the dilation rates of 1 and 2, respectively. A dilated convolutional layer with a dilation rate of 2 gives a receptive field size of five while a dilated convolutional layer with a dilation rate of 1 facilitates targeting of local information. By utilizing the pairs of parallel dilated convolutional neural network layers, the masking head 406 is able to analyze higher resolution features and generate higher resolution object masks than it would be able to if there was a single convolutional layer in place of each of the pairs. For example, in some instances, using the pairs of parallel dilated convolutional neural network layers enables the masking head 406 to almost double the resolution of the object masks available when using a single convolutional layer instead.

As shown in FIG. 4D, the masking head 406 generates an object mask 432 for a digital object detected from the digital image 410. In particular, the masking head 406 generates the object mask 432 utilizing the feature maps generated by the neural network encoder 402 for a digital object detected by the detection heads 404. For example, in some cases, the masking head 406 utilizes an approximate boundary generated by the detection heads 404 to generate an object mask for a corresponding digital object based on the feature maps.

As shown FIG. 4D, the detection-masking neural network 400 generates expanded approximate boundaries (e.g., via the operation 434) from the approximate boundaries generated by the detection heads 404. Thus, in some instances, the masking head 406 utilizes an expanded approximate boundary to generate an object mask for a corresponding digital object based on the feature maps. More detail regarding expanded approximate boundaries will be discussed below with reference to FIGS. 5A-5B.

In one or more embodiments, the on-device masking system 106 utilizes the masking head 406 to generate at least one object mask for each digital object detected from the digital image 410. Thus, for a single digital image, the detection-masking neural network 400 outputs multiple object masks in some implementations.

As just mentioned, in one or more embodiments, the on-device masking system 106 utilizes the detection-masking neural network to generate expanded approximate boundaries for the digital objects detected by its detection heads. In some cases, the on-device masking system 106 utilizes the expanded approximate boundaries to avoid artifacts that arise when using tightly conforming approximate boundaries. FIGS. 5A-5B illustrate a visual comparison of the approximate boundaries and expanded approximate boundaries generated for digital objects in accordance with one or more embodiments.

In particular, FIG. 5A illustrates bounding boxes 504a, 504b, 504c generated for digital objects portrayed within a digital image 502 without expansion. In particular, the bounding boxes 504a-504c tightly conform to the digital objects, closely approaching or touching their outer edges in one or more locations. In other words, the bounding boxes 504-504c do not expand much beyond the outermost edges of the digital objects, if at all. As shown in FIG. 5A, the tightness of the bounding boxes 504a-504c results in a form of artifact in several locations 506a, 506b, 506c, 506d, 506e, 506f, 506g where the pixels of the detected digital objects stick to the bounding boxes 504a-504c in an unnatural manner. Accordingly, using such bounding boxes can lead to inaccurate object masks that incorporate these artifacts.

In contrast, FIG. 5B illustrates expanded bounding boxes 510a, 510b, 510c generated for the digital objects portrayed in the digital image 502. As further shown, the artifacts resulting from the tight bounding boxes do not appear as a result of the expanded bounding boxes 510a-510c. Thus, in one or more embodiments, the on-device masking system 106 utilizes expanded approximate boundaries to generate more accurate object masks that do not incorporate such artifacts. As described above, in some cases, the on-device masking system 106, via the detection-masking neural network, generates approximate boundaries for digital objects detected within a digital image and generates expanded approximate boundaries from the approximate boundaries.

In some cases, the on-device masking system 106 implements expanded approximate boundaries during inference time as described above with reference to FIG. 4D. In some implementations, however, the on-device masking system 106 further utilizes expanded approximate boundaries while learning parameters for the detection-masking neural network.

Figure 6:
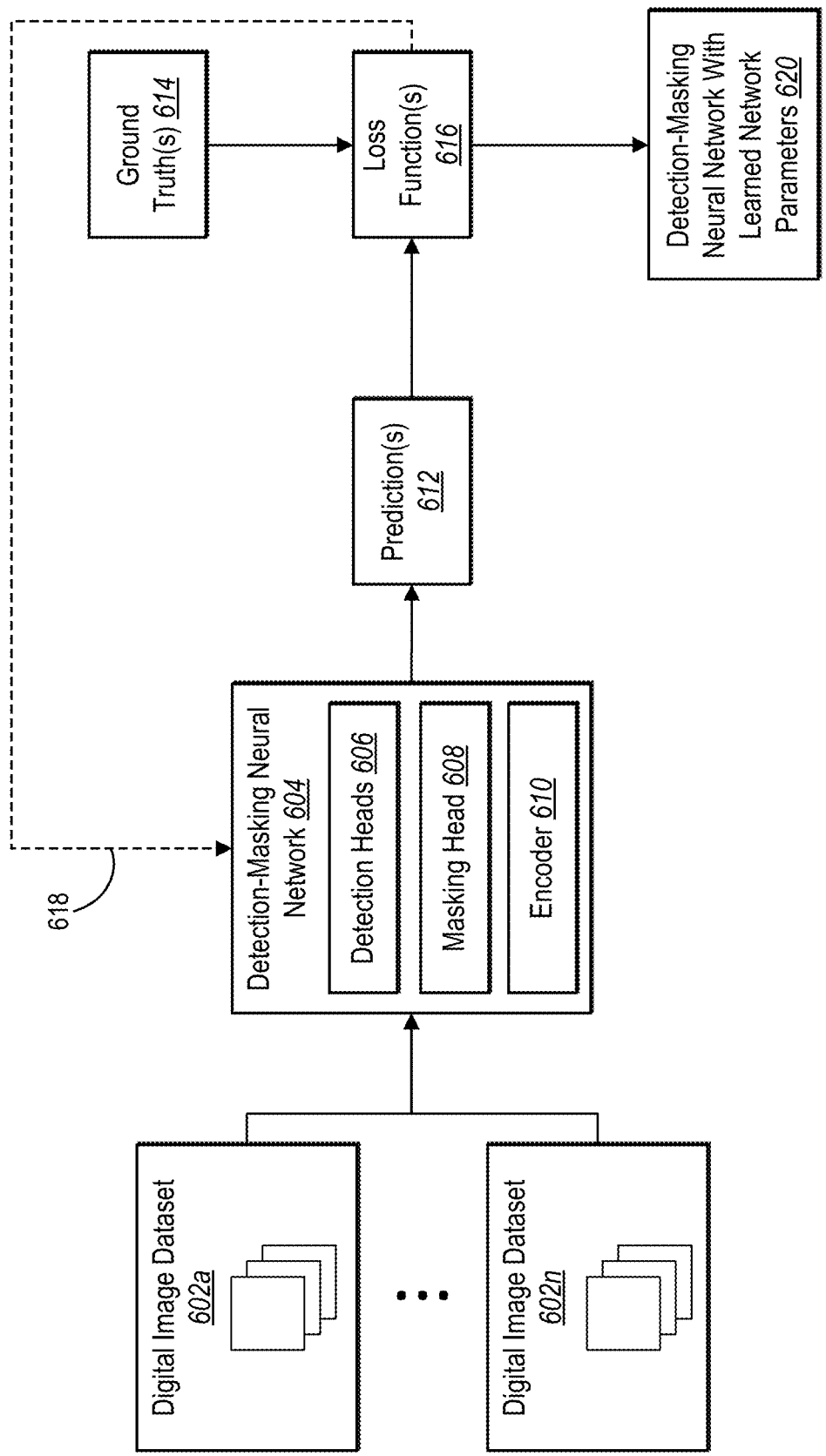
FIG. 6 illustrates a block diagram for training a detection-masking neural network in accordance with one or more embodiments.

In one or more embodiments, the on-device masking system 106 trains a detection-masking neural network to detect digital objects portrayed within digital images and to generate object masks for the digital objects. FIG. 6 illustrates a block diagram for training a detection-masking neural network in accordance with one or more embodiments.

As shown in FIG. 6, the on-device masking system 106 implements the training by providing digital images from digital images datasets 602a-602n to a detection-masking neural network 604. In particular, as shown, the detection-masking neural network 604 includes detection heads 606, and the on-device masking system 106 provides digital images from the digital image datasets 602a-602n for analysis by different detection heads. To illustrate, in one or more embodiments, the on-device masking system 106 provides digital images from a first digital image dataset (e.g., the digital image dataset 602a) for analysis by a first detection head, provides digital images from a second digital image dataset for analysis by a second detection head, etc.

As previously indicated, each digital image dataset is associated with one or more digital object classes. In other words, each digital image dataset includes digital images associated with one or more digital object classes. Further, in some embodiments, the digital object class(es) associated with one digital image dataset differs from the digital object classes associated with the other digital image datasets. Thus, in some implementations, by associating each digital image dataset with a particular detection head, the on-device masking system 106 trains each detection head on a particular set of one or more digital object classes.

In one or more embodiments, the on-device masking system 106 provides one digital image to the detection-masking neural network 604 per iteration of training. In some cases, the on-device masking system 106 provides one digital image from each of the digital image datasets 602a-602n per iteration of training.

As illustrated in FIG. 6, the on-device masking system 106 utilizes the detection-masking neural network 604 to analyze the digital images from the digital image datasets and generate prediction(s) 612. In particular, the detection-masking neural network 604 utilizes a neural network encoder 610 to encode the digital images, the detection heads 606 to predict digital objects portrayed in the digital images, and a masking head 608 to generate predicted object masks for the predicted digital objects. Thus, in some cases, for each iteration of training, the detection-masking neural network 604 generates the prediction(s) 612 by generating a prediction of at least one digital object portrayed in a digital image (e.g., a predicted approximate boundary) and/or at least one predicted object mask for the digital object.

As further shown in FIG. 6, the on-device masking system 106 compares the prediction(s) 612 to a corresponding ground truth(s) 614 via a loss function(s) 616. For example, in one or more embodiments, the on-device masking system 106 utilizes Focal Loss as a loss function in training the detection heads 606. Accordingly, the on-device masking system 106 compares a prediction of a digital object portrayed in a digital image (e.g., a predicted approximate boundary) to a corresponding ground truth via the Focal Loss function. The on-device masking system 106 utilizes other loss functions to train the detection heads 606 in some embodiments, such as a cross-entropy loss. In some implementations, the on-device masking system 106 utilizes a combination of losses to train the detection heads 606. Further, in some embodiments, the on-device masking system 106 utilizes one or more or a combination of various losses (e.g., cross-entropy loss, dice loss, L1 loss, L2 loss, etc.) to train the masking head 608.

In one or more embodiments, the on-device masking system 106 back propagates the determined losses (i.e., errors) to the detection-masking neural network 604 (as shown by the dashed line 618) to optimize the detection-masking neural network 604 by updating its parameters. Indeed, the on-device masking system 106 updates the parameters to minimize the error of the detection-masking neural network 604, such as the error of the detection heads 606 and the error of the masking head 608. Through several iterations of training, the on-device masking system 106 generates the detection-masking neural network with learned network parameters 620.

In some cases, the on-device masking system 106 trains the detection heads detection heads 606 and the masking head 608 simultaneously. For example, in some cases, the on-device masking system 106 updates the parameters of one or more detection heads and the masking head 608 in each training iteration. In some embodiments, however, the on-device masking system 106 trains the detection heads 606 and the masking head 608 separately.

By learning the parameters for the detection heads 606 using digital image datasets associated with a variety of digital object classes, the on-device masking system 106 flexibly detects digital objects associated with a wider array of object classes when compared to conventional systems. Further, the on-device masking system 106 improves the generalization of its detection model when compared to conventional systems, facilitating more accurate detection of digital objects that were not seen during training.

In some implementations, the on-device masking system 106 implements norm decoupling during the training process to accommodate instances where the digital image datasets 602a-602c include widely varying numbers of digital images. Indeed, in some cases, a detection head trained on a digital image dataset with a small number of digital images experiences more repetitions of the same data samples that a detection head trained on a digital image dataset having a larger number of digital images. Accordingly, in some instances, the detection head trained on the smaller number of digital images updates its parameters more aggressively, leading to overfitting and overly confident detection scores during inference.

Accordingly, in some embodiments, the on-device masking system 106 implements norm decoupling to balance the contributions of the different detection heads to the detection results. To illustrate, in one or more embodiments, the on-device masking system 106 decouples the length of each parameter vector (the norm) from its direction (or unit vector). Further, the on-device masking system 106 shares the same learnable norm among the various detection heads while allowing each detection head to learn its unit vector separately.

In one or more embodiments, given D number of digital image datasets and $W_i \in \{W_1, \ldots, W_D\}$, which denotes either the flattened weight or bias parameters of an unshared layer belonging to the i-th detection head, the on-device masking system 106 performs norm decoupling and obtains the new parameters $W'_i$ (that is used in place of the original $W_i$) as follows:

$$W'_i = \frac{W_i}{\|W_i\|_2} \cdot n \qquad (3)$$

In equation 3, $n \in \mathbb{R}$ represents the learnable scalar norm parameter that is shared across all detection heads and independent of $W_i$. In one or more embodiments, by using norm decoupling during the training process, the on-device masking system 106 maintains consistent weight norms across the various detection heads of the detection-masking neural network 604.

Additionally, as mentioned above, in some implementations, the on-device masking system 106 utilizes equations 1-2 during the training process to determine a global mean and a global variance and to normalize the feature maps of the pyramid levels, across GPUs. Accordingly, the on-device masking system 106 enables full parameter shareability for a detection head across all pyramid levels during inference.

Thus, the on-device masking system 106 trains a detection-masking neural network to detect digital objects and generate corresponding object masks. In one or more embodiments, the algorithms and acts described with reference to FIG. 6 can comprise the corresponding structure for performing a step for, utilizing predicted digital objects from digital images of a plurality of digital image datasets, learning parameters of a detection-masking neural network for detecting digital objects portrayed in digital images. Further, the detection-masking neural network architecture described with reference to FIGS. 4A-4C can comprise the corresponding structure for performing a step for, utilizing predicted digital objects from digital images of a plurality of digital image datasets, learning parameters of a detection-masking neural network for detecting digital objects portrayed in digital images.

Figure 7:
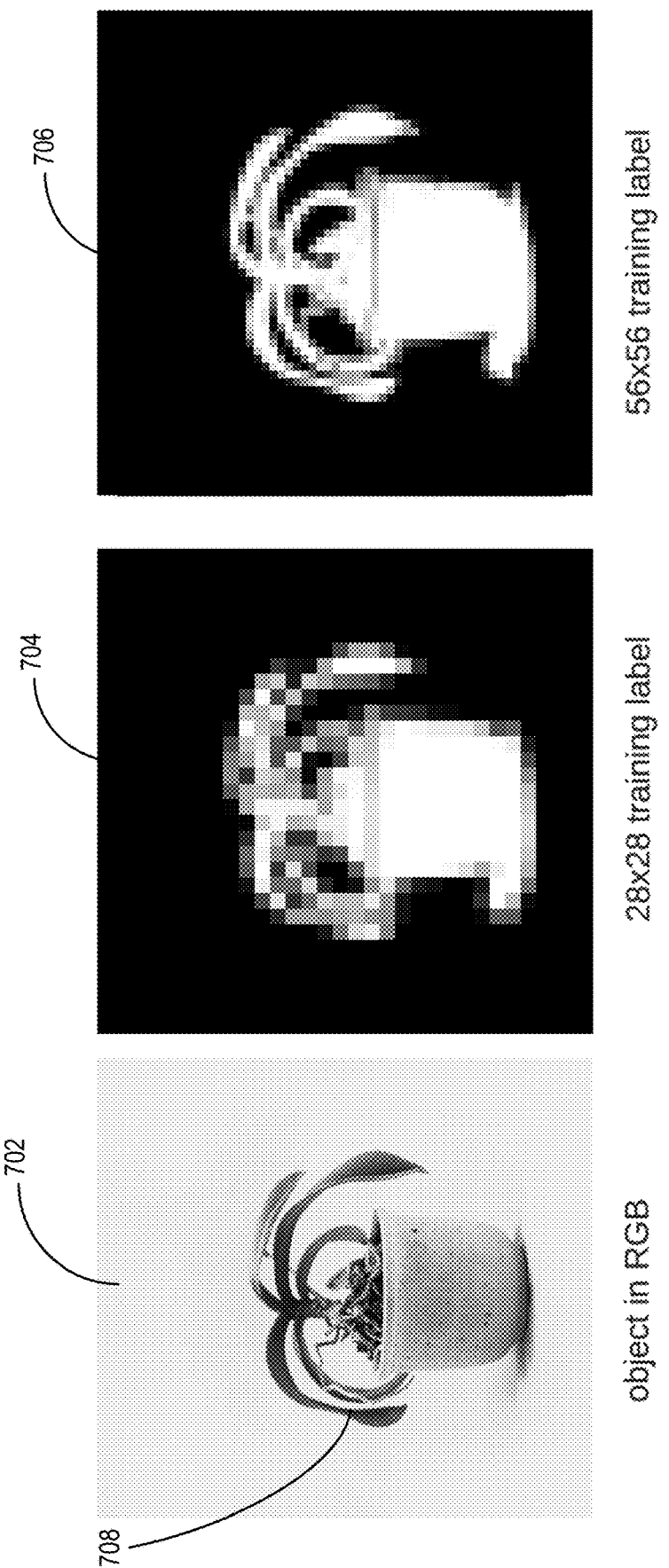
FIGS. 7A-7C illustrate a visual comparison of the object details captured by an object mask and an up-sampled object mask in accordance with one or more embodiments.

In some cases, the on-device masking system 106 utilizes up-sampled mask predictions and corresponding ground truth ground truths for loss computation during the training process to better preserve the fine details of the corresponding digital objects portrayed in digital images. FIGS. 7A-7C illustrate a visual comparison of the object details captured by object masks of various resolutions in accordance with one or more embodiments.

In particular, FIG. 7A illustrates a digital image 702 portraying a digital object 708 (e.g., a plant positioned inside a cup). FIG. 7B illustrates a low-resolution ground truth object mask 704 that corresponds to the digital object 708. Such a low-resolution ground truth is often utilized by conventional systems for loss computation. As can be seen, however, the low-resolution ground truth object mask 704 fails to capture many of the details of the digital object 708. For example, as shown, the low-resolution ground truth object mask 704 fails to capture details at the handle of the cup that is part of the digital object 708. The loss of detail is often exacerbated when the digital objects that are portrayed are large.

Accordingly, by utilizing low-resolution ground truth object masks during the training process, conventional systems often fail to train their models to capture the lost detail. As a result, the models trained by such systems typically fail to generate object masks that accurately represent the digital objects portrayed in digital images by including these details.

FIG. 7C illustrates a higher-resolution ground truth object mask 706 that corresponds to the digital object 708 portrayed in the digital image 702. As shown, the higher-resolution ground truth object mask 706 better captures the details of the digital object 708 than the low-resolution ground truth object mask 704. For example, the higher-resolution ground truth object mask 706 better captures details of the cup handle.

In one or more embodiments, the on-device masking system 106 up-samples the predicted object mask generated by the masking head of the detection-masking neural network, (e.g., via bilinear interpolation). The on-device masking system 106 uses the up-sampled object mask and a corresponding ground truth object mask that has been resized to match the resolution for loss computation. Accordingly, the on-device masking system 106 trains the detection-masking neural network to generate object masks that more accurately represent digital objects when compared to those systems that utilize lower resolutions for their ground truths.

Additionally, as mentioned above, in some cases, the on-device masking system 106 utilizes expanded approximate boundaries for training the masking head of the detection-masking neural network. For example, in some embodiments, the on-device masking system 106 utilizes the detection-masking neural network to generate an expanded approximate boundary from a predicted approximate boundary generated by the detection heads. The on-device masking system 106 further utilizes the masking head of the detection-masking neural network to generate a predicted object mask based on the expanded approximate boundary. Accordingly, in some cases, the on-device masking system 106 up-samples the predicted object mask generated from the expanded approximate boundary for computation loss.

Figure 8:
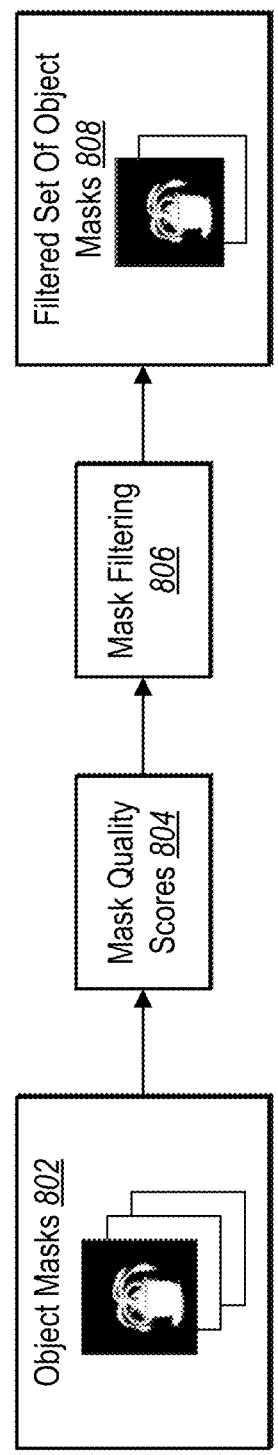
FIG. 8 illustrates a block diagram for determining a set of object masks for presentation using post-processing techniques in accordance with one or more embodiments.

As previously mentioned, in some embodiments, the on-device masking system 106 generates a plurality of object masks from a digital image. In some cases, the on-device masking system 106 implements post-processing techniques for determining which of the object masks to present via a client device. In particular, the on-device masking system 106 determines a set of objects masks, from the set of generated objects masks, that can be used for presentation via a client device. FIG. 8 illustrates a block diagram for determining a set of object masks for presentation using post-processing techniques in accordance with one or more embodiments.

As shown in FIG. 8, the on-device masking system 106 obtains object masks 802. In particular, the on-device masking system 106 generates the object masks 802 from a digital image utilizing a detection-masking neural network. As further shown in FIG. 8, the on-device masking system 106 determines mask quality scores 804 for the object masks 802. For instance, in some cases, the on-device masking system 106 determines a mask quality score for each object mask from the object masks 802. As used herein, the term "mask quality score" refers to a metric that indicates the quality of an object mask. In particular, in some embodiments, a mask quality score refers to a value that indicates how well an object mask captures the details (e.g., the boundary details) of a corresponding digital object. The algorithm presented below represents a characterization of how the on-device masking system 106 determines the mask quality scores 804 for the object masks 802 in some embodiments.

---
Algorithm 1
---

Input: Predicted N × N mask map M
Output: Mask Quality score MaskQ
$M_{bi}$ = (M ≥ T).to(bool)
$M_{bo}$: recording pixels that are on the boundaries of the masks
($m_{ij} \in M_{bo}$ = 1 if $m_{ij}$ can reach to the edge of the image
without crossing any 1s in $M_{bi}$, otherwise $m_{ij}$ = 0
$M_i$ = (M * $M_{bi}$ * (1 − $M_{bo}$), dim = [1,2])
MaskQ = sum($M_i$)/sum(M)

---

In algorithm 1, $M_{bi}$ represents a binary mask obtained by comparing the generated object mask M to a threshold T. Further, $M_{bo}$ represents a binary mask that records the pixels of that are on the boundaries of the object mask M. Accordingly, using algorithm 1, the on-device masking system 106 determines a mask quality score for an object mask based on the statistics of the confidence scores of the pixels in the object mask. In particular, the on-device masking system 106 utilizes the binary mask obtained using the threshold T to compute the average pixel-wise prediction scores contained in the binary mask and uses those scores to determine the quality of the object mask.

Algorithm 1 is model-independent and has less computational overhead compared to the models used by some conventional systems, which employ small networks to learn to predict quality scores. Thus, by utilizing algorithm 1, the on-device masking system 106 operates more efficiently than such systems.

Further, researchers compared the performance of the on-device masking system 106 using algorithm 1 to determine mask quality scores for generated object masks. In particular, the researchers compared the performance of algorithm 1 to that of the quality prediction model described by Lu Yang et al., *Quality-aware Network for Human Parsing*, arXiv preprint arXiv:2103.05997, 2021. The researchers determined how the scores provided by each tested model aligned with the scores predicted by a learned module using Kendall's tau coefficient. Algorithm 1 performed better, obtaining an alignment of 0.85 while the model described by Yang et al. obtained an alignment of 0.72. The improved performance may be attributed to the potential of Algorithm 1 of addressing an issue that appears by use of the other model where many internal areas are falsely labeled as boundaries and not counted.

As further shown in FIG. 8, the on-device masking system 106 utilizes a filtering process (e.g., represented by box 806) to determine a filtered set of object masks 808 from the object masks 802. In particular, in one or more embodiments, the on-device masking system 106 utilizes the mask quality scores 804 of the object masks 802 to determine the filtered set of object masks 808. The algorithm presented below represents a characterization of how the on-device masking system 106 determines the filtered set of object masks 808 in some embodiments.

---
Algorithm 2
---

Input: A list of n prediction tuple N = (B, M, S, $M_Q$) from the detection-masking neural network.
B: bounding boxes; M: object masks; S: confidence scores (objectness scores); $M_Q$: mask quality scores
Output: An updated list of predictions K = (B', M', S', $M'_Q$)
Keep an occupation binary map O, initialize with all 0s
Sort n predictions from high to low by S
for each prediction set ($b_i$, $s_i$, $mq_i$, $m_i$) do
   compute new region: $m_{ni}$ = AND($m_i$, NOT(O))

---
-continued

Algorithm 2
--- if sum($m_{ni}$)/sum($m_i$) > $T_0$ or $s_i$ > $T_1$ or ($mq_i$ > $T_2$ and sum($m_{ni}$)/sum($m_i$) > $T_3$)
then
   Add ($b_i$, $s_i$, $mq_i$, $m_i$) to K   //add original boxes and masks to the final list
   Update O
else
   if sum($m_{ni}$)/sum($m_i$) > $T_4$ then
     Update $b_i$ based on $m_{ni}$
     Add ($b_i$, $s_i$, $mq_i$, $m_i$) to K   //add non-overlap boxes and masks to final list
     Update O
   end if
end if
end for

---

Accordingly, using algorithm 2, the on-device masking system 106 uses the mask quality scores and confidence scores corresponding to the determined approximate boundaries to remove low-quality object masks and maintain high-quality object masks for presentation via a computing device. In particular, in one or more embodiments, the on-device masking system 106 iterates through each of the object masks (e.g., starting with the object mask associated with the highest confidence score), computes the portion of the object mask that constitutes a new region (e.g., a region that is not already occupied by a previously-considered object mask) using an occupation binary map, and determines whether to add the object mask to the filtered set of object masks 808 based on whether the new region and/or some other values associated with the object mask satisfy a corresponding threshold. Thus, in some embodiments, the on-device masking system 106 utilizes algorithm 2 to filter out object masks that have low quality due to overlap with one or more other object masks. In one or more embodiments, the thresholds used in algorithms 1-2 are configurable.

By determining the filtered set of object masks 808, the on-device masking system 106 facilitates the presentation of high-quality object masks via a computing device. In particular, in some embodiments, the on-device masking system 106 facilitates the provision of object masks that do not overlap one another. Further, in some cases, the on-device masking system 106 removes false positives that overlap with high-quality masks while choosing smaller, more confident regions.

Researchers compared the performance of the on-device masking system 106 with the post-processing techniques characterized by algorithms 1-2 to the performance of the on-device masking system 106 without post-processing. Using an intersection over union (IoU) of 50%, the on-device masking system 106 improved the recall of the resulting object masks from 66.2% to 67.4% utilizing the post-processing techniques.

Figure 9:
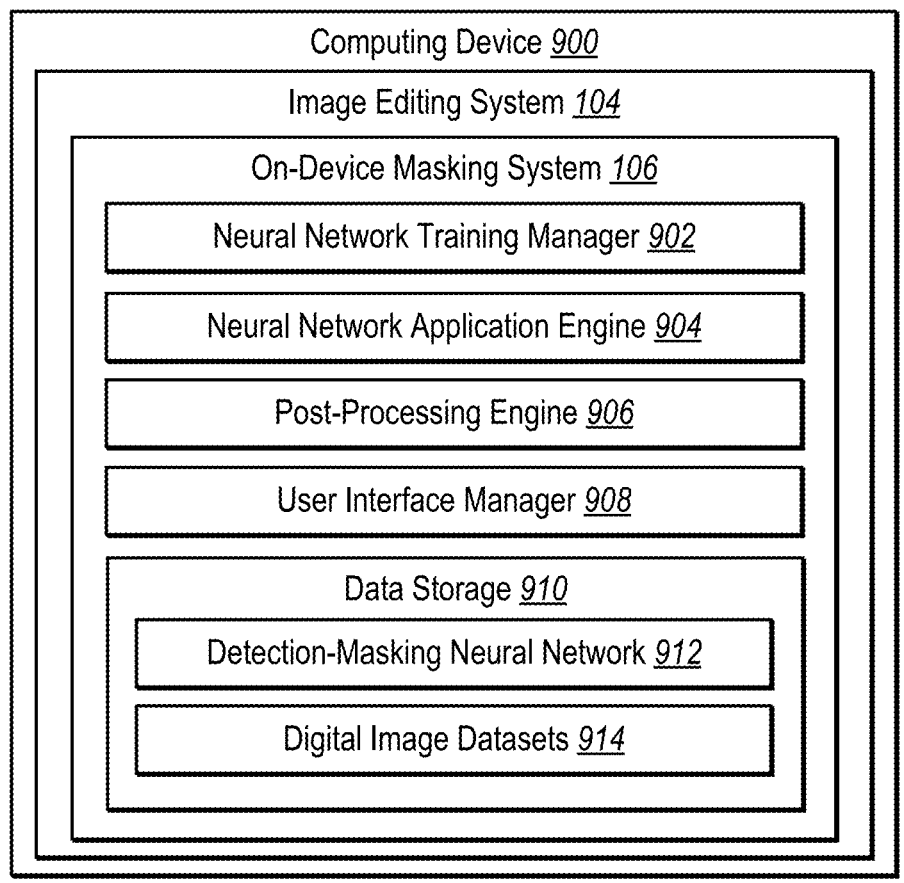
FIG. 9 illustrates an example schematic diagram of an on-device masking system in accordance with one or more embodiments.

Turning to FIG. 9, additional detail will now be provided regarding various components and capabilities of the on-device masking system 106. In particular, FIG. 9 shows the on-device masking system 106 implemented by the computing device 900 (e.g., the server(s) 102 and/or one of the client devices 110*a*-110*n* discussed above with reference to FIG. 1). Additionally, the on-device masking system 106 is also part of the image editing system 104. As shown, in one or more embodiments, the on-device masking system 106 includes, but is not limited to, a neural network training manager 902, a neural network application engine 904, a post-processing engine 906, a user interface manager 908, and data storage 910 (which includes a detection-masking neural network 912 and digital image datasets 914).

As just mentioned, and as illustrated in FIG. 9, the on-device masking system 106 includes the neural network training manager 902. In one or more embodiments, the on-device masking system 106 trains a detection-masking neural network to detect digital objects within digital images and to generate object masks for the detected digital objects. For example, in some embodiments, the neural network training manager 902 trains multiple detection heads of the detection-masking neural network to detect digital objects using different digital image datasets associated with different digital object classes. Further, the on-device masking system 106 trains a masking head of the detection-masking neural network to generate object masks for the digital objects identified by the detection heads.

Additionally, as shown in FIG. 9, the on-device masking system 106 includes the neural network application engine 904. In one or more embodiments, the neural network application engine 904 implements the detection-masking neural network trained by the neural network training manager 902. For instance, in some cases, the neural network application engine 904 receives a digital image and utilizes the detection-masking neural network to generate object masks for digital objects portrayed in the digital image.

As shown in FIG. 9, the on-device masking system 106 further includes the post-processing engine 906. In one or more embodiments, the post-processing engine 906 determines a set of object masks that can be used for presentation via a computing device. For instance, in some cases, the post-processing engine 906 determines mask quality scores for the object masks generated by the detection-masking neural network. The post-processing engine 906 further utilizes the mask quality scores and/or other attributes of the generated object masks to filter out low-quality masks and determine a filtered set of object masks for presentation.

Further, as shown, the on-device masking system 106 includes the user interface manager 908. In one or more embodiments, the user interface manager 908 manages presentation of one or more object masks via a computing device (e.g., via a graphical user interface of the computing device 900). For example, in some cases, the user interface manager 908 detects selection of a digital object portrayed within a digital image. In response to detecting the selection, the user interface manager 908 retrieves a corresponding object mask generated by the detection-masking neural network and provides the object mask for display.

As show in FIG. 9, the on-device masking system 106 also includes data storage 910. In particular, data storage 910 includes the detection-masking neural network 912 and digital image datasets 914.

Each of the components 902-914 of the on-device masking system 106 can include software, hardware, or both. For example, the components 902-914 can include one or more instructions stored on a computer-readable storage medium and executable by processors of one or more computing devices, such as a client device or server device. When executed by the one or more processors, the computer-executable instructions of the on-device masking system 106 can cause the computing device(s) to perform the methods described herein. Alternatively, the components 902-914 can include hardware, such as a special-purpose processing device to perform a certain function or group of functions. Alternatively, the components 902-914 of the on-device masking system 106 can include a combination of computer-executable instructions and hardware.

Furthermore, the components 902-914 of the on-device masking system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 902-914 of the on-device masking system 106 may be implemented as a stand-alone application, such as a desktop or mobile application. Furthermore, the components 902-914 of the on-device masking system 106 may be implemented as one or more web-based applications hosted on a remote server. Alternatively, or additionally, the components 902-914 of the on-device masking system 106 may be implemented in a suite of mobile device applications or "apps." For example, in one or more embodiments, the on-device masking system 106 can comprise or operate in connection with digital software applications such as ADOBE® PHOTOSHOP® or ADOBE® LIGHTROOM®. "ADOBE," "PHOTOSHOP," and "LIGHTROOM" are either registered trademarks or trademarks of Adobe Inc. in the United States and/or other countries.

Figure 10:
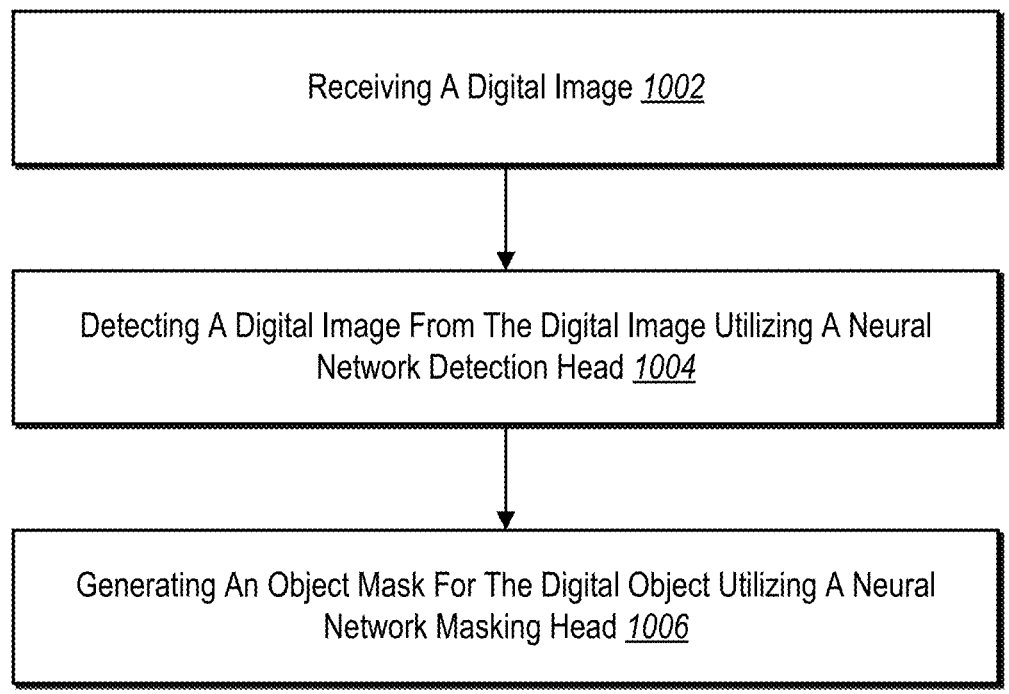
FIG. 10 illustrates a flowchart of a series of acts for generating an object mask for a digital object of a digital image using a detection-masking neural network in accordance with one or more embodiments.

FIGS. 1-9, the corresponding text, and the examples provide a number of different methods, systems, devices, and non-transitory computer-readable media of the on-device masking system 106. In addition to the foregoing, one or more embodiments can also be described in terms of flowcharts comprising acts for accomplishing the particular result, as shown in FIG. 10. FIG. 10 may be performed with more or fewer acts. Further, the acts may be performed in different orders. Additionally, the acts described herein may be repeated or performed in parallel with one another or in parallel with different instances of the same or similar acts.

FIG. 10 illustrates a flowchart of a series of acts 1000 for generating an object mask for a digital object of a digital image using a detection-masking neural network in accordance with one or more embodiments. FIG. 10 illustrates acts according to one embodiment, alternative embodiments may omit, add to, reorder, and/or modify any of the acts shown in FIG. 10. In some implementations, the acts of FIG. 10 are performed as part of a method. For example, in some embodiments, the acts of FIG. 10 are performed, in a digital medium environment for editing digital images, as part of a computer-implemented method for building or implementing a neural network for image segmentation. Alternatively, a non-transitory computer-readable medium can store instructions thereon that, when executed by at least one processor, cause a computing device to perform the acts of FIG. 10. In some embodiments, a system performs the acts of FIG. 10. For example, in one or more embodiments, a system includes at least one memory device comprising a detection-masking neural network comprising: a neural network encoder that extracts encoded feature maps from digital images; a plurality of detection heads, each detection head comprising at least one neural network layer and corresponding to one or more digital object classes that differ from digital object classes corresponding to other detection heads from the plurality of detection heads; and a masking head comprising additional neural network layers. The system further includes at least one server device configured to cause the system to perform the acts of FIG. 10.

The series of acts 1000 includes an act 1002 of receiving a digital image. For instance, in one or more embodiments, the act 1002 involves receive a digital image at a computing device. In some cases, the digital image portrays a single digital object. In some implementations, however, the digital image portrays multiple digital objects.

The series of acts 1000 also includes an act 1004 of detecting a digital object from the digital image utilizing a neural network detection head. For example, in some embodiments, the act 1004 involves detecting, at the computing device utilizing a detection head of a detection-masking neural network, a digital object portrayed in the digital image. In one or more embodiments, the on-device masking system 106 detects, at the computing device utilizing the detection head of the detection-masking neural network, the digital object portrayed in the digital image by detecting the digital object utilizing the detection head having a multi-scale synchronized batch normalization neural network layer.

In some implementations, the on-device masking system 106 detects, at the computing device utilizing the detection head of the detection-masking neural network, the digital object portrayed in the digital image by: generating, at the computing device utilizing the detection head, an objectness score for a portion of the digital image; and determining that the portion of the digital image corresponds to the digital object utilizing the objectness score. In some embodiments, the on-device masking system 106 generates, at the computing device utilizing an additional detection head of the detection-masking neural network, an additional objectness score for the portion of the digital image. Accordingly, in some cases, determining that the portion of the digital image corresponds to the digital object utilizing the objectness score comprises determining that the portion of the digital image corresponds to the digital object utilizing the objectness score and the additional objectness score. In at least one implementation, determining that the portion of the digital image corresponds to the digital object utilizing the objectness score and the additional objectness score comprises determining that the portion of the digital image corresponds to the digital object utilizing a weighting for the objectness score and an additional weighting for the additional objectness score, the weighting and the additional weighting determined via norm decoupling of the detection head and the additional detection head.

In one or more embodiments, the on-device masking system 106 generates, at the computing device utilizing a neural network encoder of the detection-masking neural network, a set of feature maps corresponding to a plurality of levels of image features from the digital image. Accordingly, in some cases, the on-device masking system 106 detects, at the computing device utilizing the detection head of the detection-masking neural network, the digital object portrayed in the digital image by detecting, at the computing device utilizing the detection head, the digital object based on the set of feature maps.

In one or more embodiments, the on-device masking system 106 detects, at the computing device utilizing the detection head of the detection-masking neural network, the digital object portrayed in the digital image by determining, at the computing device utilizing the detection head, an approximate boundary corresponding to the digital object portrayed in the digital image. In some cases, the on-device masking system 106 further generates an expanded approximate boundary for the digital object based on the approximate boundary.

The series of acts 1000 further includes an act 1006 of generating an object mask for the digital object utilizing a neural network masking head. For instance, in some cases, the act 1006 involves generating, at the computing device utilizing a masking head of the detection-masking neural network, an object mask for the digital object.

In one or more embodiments, the on-device masking system 106 generates, at the computing device utilizing the masking head of the detection-masking neural network, the object mask for the digital object by generating, at the computing device utilizing the masking head of the detection-masking neural network, the object mask based on an expanded approximate boundary for the digital object.

In one or more embodiments, the series of acts 1000 further includes acts for implementing one or more post-processing techniques after generation of one or more object masks from a digital image. For example, in some instances, the acts include determining confidence scores for pixels of the object mask generated for the digital object; generating a binary mask corresponding to the object mask utilizing the confidence scores for the pixels; and generating a mask quality score for the object mask utilizing the binary mask and the confidence scores for the pixels. In some cases, the on-device masking system 106 determines to include the object mask generated for the digital object in a set of object masks utilizing at least one of the object mask, a bounding box corresponding to the digital object, a confidence score corresponding to the bounding box, and the mask quality score for the object mask; and provides the object mask for display on the computing device based on inclusion of the object mask in the set of object masks.

As previously mentioned, in one or more embodiments, the series of acts 1000 include acts for building a neural network for image segmentation. For instance, in some cases, the acts include accessing a plurality of digital image datasets comprising digital images portraying at least one digital object with an associated class label, wherein each digital image dataset from the plurality of digital image datasets corresponds to one or more digital object classes that differ from digital object classes corresponding to other digital image datasets from the plurality of digital image datasets; and utilizing a detection-masking neural network to predict digital objects portrayed in the digital images of the plurality of digital image datasets, the detection-masking neural network comprising a detection head for each digital image dataset that is configured to detect digital objects from the one or more digital object classes of the digital image dataset. In some implementations, the acts further include learning parameters for the detection-masking neural network utilizing the predicted digital objects. The on-device masking system 106 can further implement the detection-masking neural network by detecting a digital object portrayed in a digital image by generating one or more objectness scores for the digital object utilizing the detection-masking neural network with the learned parameters. In some cases, the on-device masking system 106 further generates an object mask for the digital object detected from the digital image utilizing a masking head of the detection-masking neural network.

To provide an illustration, in one or more embodiments, the on-device masking system 106 generates a plurality of encoded feature maps from a digital image utilizing the neural network encoder; detects a digital object portrayed in the digital image utilizing the plurality of detection heads based on the plurality of encoded feature maps; and generates an object mask for the digital object utilizing the masking head. In some cases, the on-device masking system 106 detects the digital object portrayed in the digital image utilizing the plurality of detection heads based on the plurality of encoded feature maps by: generating a plurality of class-agnostic objectness scores for a portion of the digital image utilizing the plurality of detection heads based on the plurality of encoded feature maps; and determining that the portion of the digital image corresponds to the digital object utilizing the plurality of class-agnostic objectness scores. In some instances, determining that the portion of the digital image corresponds to the digital object utilizing the plurality of class-agnostic objectness scores comprises determining that the portion of the digital image corresponds to the digital object based on determining that one or more objectness scores from the plurality of class-agnostic objectness scores satisfies a detection threshold.

In one or more embodiments, the on-device masking system 106 further generates additional object masks for one or more digital objects portrayed in the digital image; generates an occupation binary map corresponding to the digital image; determines to include the object mask or at least one of the additional object masks in a set of object masks by comparing the object mask and the additional object masks to the occupation binary map; and provides one or more digital object masks for display on a client device based on inclusion of the one or more digital object masks in the set of object masks.

In one or more embodiments, the plurality of detection heads of the detection-masking neural network share a set of convolutional parameters and each detection head includes a set of output parameters learned separately from output parameters of the other detection heads. In some embodiments, the additional neural network layers of the masking head of the detection-masking neural network comprises parallel dilated convolutional neural network layers that capture local features associated with digital objects. Further, in some instances, the plurality of detection heads comprise a multi-scale synchronized batch normalization neural network layer that normalizes the plurality of encoded feature maps generated from the digital image.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
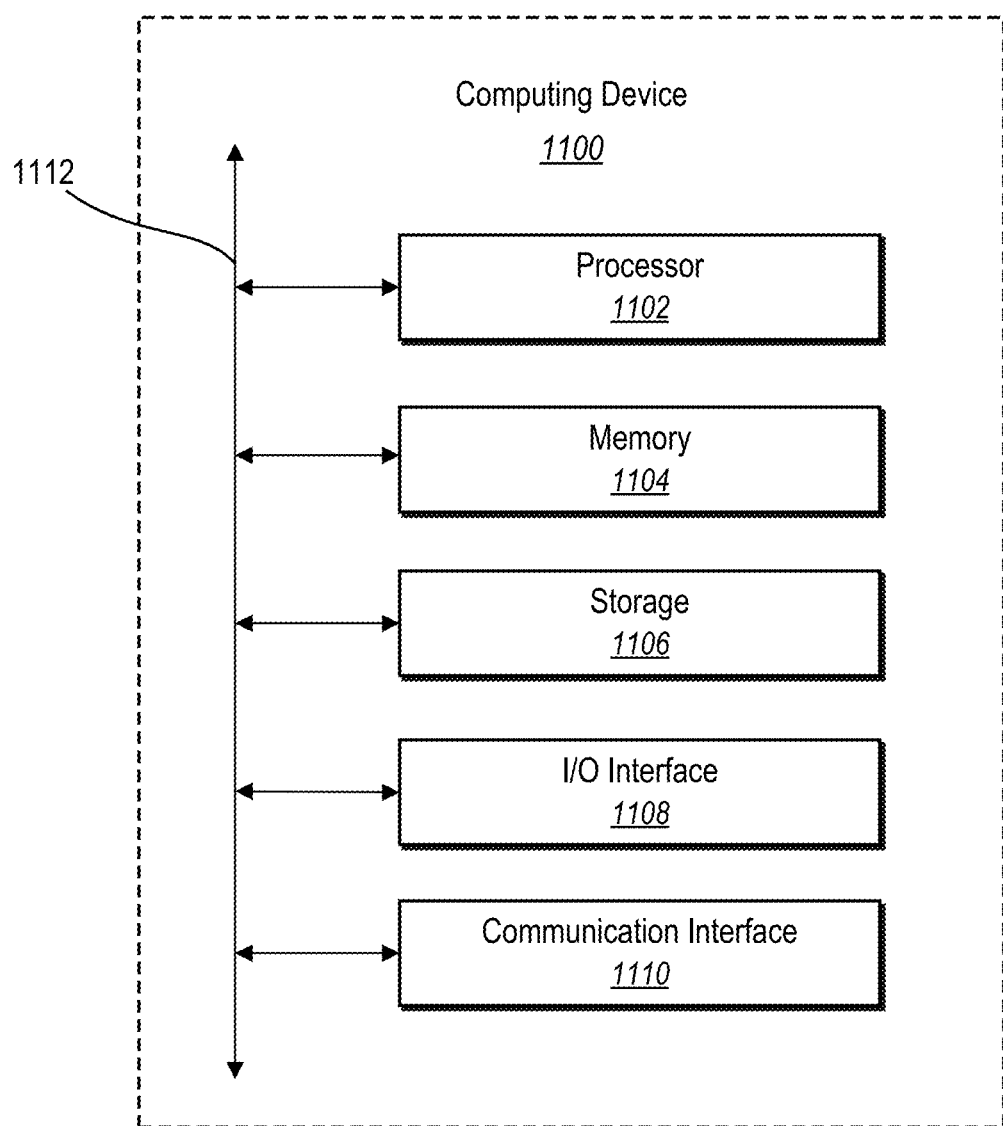
FIG. 11 illustrates a block diagram of an exemplary computing device in accordance with one or more embodiments.

FIG. 11 illustrates a block diagram of an example computing device 1100 that may be configured to perform one or more of the processes described above. One will appreciate that one or more computing devices, such as the computing device 1100 may represent the computing devices described above (e.g., the server(s) 102 and/or the client devices 110a-110n). In one or more embodiments, the computing device 1100 may be a mobile device (e.g., a mobile telephone, a smartphone, a PDA, a tablet, a laptop, a camera, a tracker, a watch, a wearable device). In some embodiments, the computing device 1100 may be a non-mobile device (e.g., a desktop computer or another type of client device). Further, the computing device 1100 may be a server device that includes cloud-based processing and storage capabilities.

As shown in FIG. 11, the computing device 1100 can include one or more processor(s) 1102, memory 1104, a storage device 1106, input/output interfaces 1108 (or "I/O interfaces 1108"), and a communication interface 1110, which may be communicatively coupled by way of a communication infrastructure (e.g., bus 1112). While the computing device 1100 is shown in FIG. 11, the components illustrated in FIG. 11 are not intended to be limiting. Additional or alternative components may be used in other embodiments. Furthermore, in certain embodiments, the computing device 1100 includes fewer components than those shown in FIG. 11. Components of the computing device 1100 shown in FIG. 11 will now be described in additional detail.

In particular embodiments, the processor(s) 1102 includes hardware for executing instructions, such as those making up a computer program. As an example, and not by way of limitation, to execute instructions, the processor(s) 1102 may retrieve (or fetch) the instructions from an internal register, an internal cache, memory 1104, or a storage device 1106 and decode and execute them.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1104 may be internal or distributed memory.

The computing device 1100 includes a storage device 1106 including storage for storing data or instructions. As an example, and not by way of limitation, the storage device 1106 can include a non-transitory storage medium described above. The storage device 1106 may include a hard disk drive (HDD), flash memory, a Universal Serial Bus (USB) drive or a combination these or other storage devices.

As shown, the computing device 1100 includes one or more I/O interfaces 1108, which are provided to allow a user to provide input to (such as user strokes), receive output from, and otherwise transfer data to and from the computing device 1100. These I/O interfaces 1108 may include a mouse, keypad or a keyboard, a touch screen, camera, optical scanner, network interface, modem, other known I/O devices or a combination of such I/O interfaces 1108. The touch screen may be activated with a stylus or a finger.

The I/O interfaces 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1108 are configured to provide graphical data to a display for presentation to a user. The graphical data may be representative of one or more graphical user interfaces and/or any other graphical content as may serve a particular implementation.

The computing device 1100 can further include a communication interface 1110. The communication interface 1110 can include hardware, software, or both. The communication interface 1110 provides one or more interfaces for communication (such as, for example, packet-based communication) between the computing device and one or more other computing devices or one or more networks. As an example, and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI. The computing device 1100 can further include a bus 1112. The bus 1112 can include hardware, software, or both that connects components of computing device 1100 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium storing executable instructions thereon which, when executed by a processing device, cause the processing device to perform operations comprising:
   receiving a digital image at a computing device;
   detecting, at the computing device utilizing a plurality of detection heads of a detection-masking neural network, a digital object portrayed in the digital image, wherein each detection head from the plurality of detection heads corresponds to a digital object class that differs from digital object classes corresponding to other detection heads from the plurality of detection heads; and
   generating, at the computing device utilizing a masking head of the detection-masking neural network, an object mask for the digital object.

2. The non-transitory computer-readable medium of claim 1, wherein:
   the operations further comprise generating, at the computing device utilizing a neural network encoder of the detection-masking neural network, a set of feature maps corresponding to a plurality of levels of image features from the digital image; and
   detecting, at the computing device utilizing the plurality of detection heads of the detection-masking neural network, the digital object portrayed in the digital image comprises detecting, at the computing device utilizing the plurality of detection heads, the digital object based on the set of feature maps.

3. The non-transitory computer-readable medium of claim 1, wherein detecting, at the computing device utilizing the plurality of detection heads of the detection-masking neural network, the digital object portrayed in the digital image comprises detecting the digital object utilizing a detection head having a multi-scale synchronized batch normalization neural network layer.

4. The non-transitory computer-readable medium of claim 1, wherein detecting, at the computing device utilizing the plurality of detection heads of the detection-masking neural network, the digital object portrayed in the digital image comprises:
   generating, at the computing device utilizing a detection head from the plurality of detection heads, an objectness score for a portion of the digital image; and
   determining that the portion of the digital image corresponds to the digital object utilizing the objectness score.

5. The non-transitory computer-readable medium of claim 4, wherein:
   the operations further comprise generating, at the computing device utilizing an additional detection head from the plurality of detection heads, an additional objectness score for the portion of the digital image,
   wherein determining that the portion of the digital image corresponds to the digital object utilizing the objectness score comprises determining that the portion of the digital image corresponds to the digital object utilizing the objectness score and the additional objectness score.

6. The non-transitory computer-readable medium of claim 5, wherein determining that the portion of the digital image corresponds to the digital object utilizing the objectness score and the additional objectness score comprises determining that the portion of the digital image corresponds to the digital object utilizing a weighting for the objectness score and an additional weighting for the additional objectness score, the weighting and the additional weighting determined via norm decoupling of the detection head and the additional detection head.

7. The non-transitory computer-readable medium of claim 1, wherein:
   detecting, at the computing device utilizing the plurality of detection heads of the detection-masking neural network, the digital object portrayed in the digital image comprises determining, at the computing device utilizing a detection head from the plurality of detection heads, an approximate boundary corresponding to the digital object portrayed in the digital image; and
   the operations further comprise generating an expanded approximate boundary for the digital object based on the approximate boundary.

8. The non-transitory computer-readable medium of claim 7, wherein generating, at the computing device utilizing the masking head of the detection-masking neural network, the object mask for the digital object comprises generating, at the computing device utilizing the masking head of the detection-masking neural network, the object mask based on the expanded approximate boundary for the digital object.

9. The non-transitory computer-readable medium of claim 4, wherein the operations further comprise:
   determining confidence scores for pixels of the object mask generated for the digital object;
   generating a binary mask corresponding to the object mask utilizing the confidence scores for the pixels; and
   generating a mask quality score for the object mask utilizing the binary mask and the confidence scores for the pixels.

10. The non-transitory computer-readable medium of claim 9, wherein the operations further comprise:
    determining to include the object mask generated for the digital object in a set of object masks utilizing at least one of the object mask, a bounding box corresponding to the digital object, a confidence score corresponding to the bounding box, and the mask quality score for the object mask; and
    providing the object mask for display on the computing device based on inclusion of the object mask in the set of object masks.

11. A system comprising:
    a memory component:
    one or more processing devices coupled to the memory component, the one or more processing devices to perform operations comprising:
    generating a plurality of encoded feature maps from a digital image utilizing a neural network encoder of a detection-masking neural network;
    detecting a digital object portrayed in the digital image utilizing a plurality of detection heads of the detection-masking neural network based on the plurality of encoded feature maps, wherein each detection head from the plurality of detection heads corresponds to a digital object class that differs from digital object classes corresponding to other detection heads from the plurality of detection heads; and
    generating an object mask for the digital object utilizing a masking head of the detection-masking neural network that includes additional neural network layers.

12. The system of claim 11, wherein detecting the digital object portrayed in the digital image utilizing the plurality of detection heads based on the plurality of encoded feature maps comprises:
- generating a plurality of class-agnostic objectness scores for a portion of the digital image utilizing the plurality of detection heads based on the plurality of encoded feature maps; and
- determining that the portion of the digital image corresponds to the digital object utilizing the plurality of class-agnostic objectness scores.

13. The system of claim 12, wherein determining that the portion of the digital image corresponds to the digital object utilizing the plurality of class-agnostic objectness scores comprises determining that the portion of the digital image corresponds to the digital object based on determining that one or more objectness scores from the plurality of class-agnostic objectness scores satisfies a detection threshold.

14. The system of claim 11, wherein the operations further comprise:
- generating additional object masks for one or more digital objects portrayed in the digital image;
- generating an occupation binary map corresponding to the digital image;
- determining to include the object mask or at least one of the additional object masks in a set of object masks by comparing the object mask and the additional object masks to the occupation binary map; and
- providing one or more digital object masks for display on a client device based on inclusion of the one or more digital object masks in the set of object masks.

15. The system of claim 11, wherein the additional neural network layers of the masking head comprise parallel dilated convolutional neural network layers that capture local features associated with digital objects.

16. The system of claim 11, wherein the plurality of detection heads share a set of convolutional parameters and each detection head includes a set of output parameters learned separately from output parameters of the other detection heads.

17. The system of claim 11, wherein the plurality of detection heads comprise a multi-scale synchronized batch normalization neural network layer that normalizes the plurality of encoded feature maps generated from the digital image.

18. A method comprising:

receiving a digital image at a computing device;

detecting, at the computing device utilizing a plurality of detection heads of a detection-masking neural network, a digital object portrayed in the digital image, wherein each detection head from the plurality of detection heads corresponds to a digital object class that differs from digital object classes corresponding to other detection heads from the plurality of detection heads; and generating, at the computing device utilizing a masking head of the detection-masking neural network, an object mask for the digital object.

19. The method of claim 18, further comprising generating, at the computing device utilizing a neural network encoder of the detection-masking neural network, a set of feature maps corresponding to a plurality of levels of image features from the digital image, wherein detecting, at the computing device utilizing the plurality of detection heads of the detection-masking neural network, the digital object portrayed in the digital image comprises detecting, at the computing device utilizing the plurality of detection heads, the digital object based on the set of feature maps.

20. The method of claim 18, wherein detecting, at the computing device utilizing the plurality of detection heads of the detection-masking neural network, the digital object portrayed in the digital image comprises detecting the digital object utilizing a detection head having a multi-scale synchronized batch normalization neural network layer.

* * * * *